US008199141B2

(12) United States Patent
Honda

(10) Patent No.: US 8,199,141 B2
(45) Date of Patent: Jun. 12, 2012

(54) DISPLAY DEVICE, AND DRIVING METHOD OF DISPLAY DEVICE

(75) Inventor: Tatsuya Honda, Kanagawa (JP)

(73) Assignee: Semiconductor Energy Laboratory Co., Ltd. (JP)

(*) Notice: Subject to any disclaimer, the term of this patent is extended or adjusted under 35 U.S.C. 154(b) by 920 days.

(21) Appl. No.: 12/047,539

(22) Filed: Mar. 13, 2008

(65) Prior Publication Data

US 2008/0231622 A1 Sep. 25, 2008

(30) Foreign Application Priority Data

Mar. 23, 2007 (JP) ................................ 2007-076283

(51) Int. Cl.
*G06F 3/038* (2006.01)
*G09G 5/00* (2006.01)

(52) U.S. Cl. ............................ 345/211; 345/94; 345/96

(58) Field of Classification Search ............ 345/87–104, 345/204, 208–213
See application file for complete search history.

(56) References Cited

U.S. PATENT DOCUMENTS

| | | | | |
|---|---|---|---|---|
| 5,287,205 | A | 2/1994 | Yamazaki et al. | |
| 5,337,070 | A * | 8/1994 | Kitajima et al. | 345/211 |
| 5,581,273 | A | 12/1996 | Yoneda et al. | |
| 2004/0263498 | A1* | 12/2004 | Yang | 345/204 |
| 2005/0007325 | A1* | 1/2005 | Kim et al. | 345/87 |
| 2005/0068282 | A1 | 3/2005 | Mizumaki | |
| 2005/0248556 | A1* | 11/2005 | Yoshinaga et al. | 345/204 |
| 2006/0232542 | A1* | 10/2006 | Nishi et al. | 345/98 |
| 2007/0057884 | A1* | 3/2007 | Akai et al. | 345/89 |
| 2007/0126685 | A1 | 6/2007 | Kimura | |
| 2008/0001901 | A1* | 1/2008 | Lee | 345/100 |

FOREIGN PATENT DOCUMENTS

| | | |
|---|---|---|
| JP | 8-328515 | 12/1996 |
| JP | 3481349 B2 | 12/2003 |

* cited by examiner

*Primary Examiner* — Kimnhung Nguyen
(74) *Attorney, Agent, or Firm* — Husch Blackwell LLP

(57) ABSTRACT

It is an object to provide a high reliable display device which can suppress the generation of high electric field near the drain of the transistor used as a switching element and a driving method thereof. A relaxation time when charge is stored in the display element of the pixel and other capacitors connected to the display element in parallel is focused on, and the voltage applied between the source and the drain of the transistor in the writing period is suppressed by changing the video signal applied to the signal line step by step and finally setting it at the desired level.

14 Claims, 21 Drawing Sheets

DISPLAY DEVICE, AND DRIVING METHOD OF DISPLAY DEVICE

BACKGROUND OF THE INVENTION

1. Field of the Invention

The present invention relates to an active matrix display device and driving method thereof.

2. Description of the Related Art

In an active matrix display device, switching elements and display elements are provided in hundreds of thousands to several millions of pixels arranged in matrix. Since application of voltage or supply of current is kept for a while by the switching elements after a video signal is inputted to a pixel, active matrix display device can respond flexibly to enlargement of display panels and high definition of display image; thus, active matrix display device is becoming mainstream.

A typical driver circuit of the above display device includes a scan line driver circuit and a signal line driver circuit. By the scan line driver circuit, a plurality of pixels are selected per one line or per a plurality of lines in some cases. Then, by the signal line driver circuit, input of a video signal to the pixel included in the selected line is controlled.

In the case of a display device using a liquid crystal material for a display element, AC drive in which polarity of the voltage applied to the display element is reversed in accordance with give timing in order to prevent deterioration of the liquid crystal material called image burn-in. For example, reference 1 (Japanese Patent No. 3481349) discloses voltage should be applied to the liquid crystal layer by AC drive. Specifically, AC drive can be performed in such a way that the polarity of a video signal inputted to each pixel is reversed based on common voltage as a reference.

SUMMARY OF THE INVENTION

However, in the case of a display device using a transistor as a switching element, there is a problem that the transistor is easy to degrade by performing AC drive. An operation of the pixel in the case of performing AC drive is described with reference to FIGS. 20A to 21.

FIG. 20A shows a general pixel structure included in an active matrix display device. A transistor 2001 is a switching element which controls input of a video signal to a pixel. In addition, a display element 2002 is an element which can display gray scales, and in a pair of electrodes of the display element 2002, an electrode to which common voltage is applied is called an opposed electrode, and an electrode to which a video signal is applied is called a pixel electrode.

In each pixel, a signal line Si (i=1 to x) and a scanning line Gj (j=1 to y) are provided. Then, a gate of the transistor 2001 is connected to the scanning line Gj. In addition, one of a source and a drain of the transistor 2001 is connected to the signal line Si, and the other is connected to the pixel electrode of the display element 2002.

FIG. 21 is a timing chart of the voltage applied to the signal line in the case that a pixel illustrated in FIG. 20A is operated by AC drive. First, as shown in FIG. 20A, when the scanning line Gj is selected in writing period, transistor 2001 is turned on. Then, when a voltage $+V_{sig}$ of a video signal is applied to the signal line Si, the voltage $+V_{sig}$ is applied to the pixel electrode of the display element 2002 via the transistor 2001. Next, as shown in FIG. 20B, when the scanning line Gj is released in accordance with termination of the writing period, the transistor 2001 is turned off. Thus, the voltage $+V_{sig}$ is held till the next writing period regardless the voltage of signal line Si.

As shown in FIG. 20C, when the scanning line Gj is selected again in the writing period, the transistor 2001 is turned on. At that time, the video signal applied to the signal line Si is set to be $-V_{sig}$ whose polarity is reversed from the voltage $+V_{sig}$. When the voltage $-V_{sig}$ is applied to the signal line Si, the voltage $-V_{sig}$ is applied to the pixel electrode of the display element 2002 via the transistor 2001. While the voltage between the source and the drain of the transistor 2001 finally becomes to approximately 0 at that time, $|2\ V_{sig}|$ of voltage is applied between the source and the drain of the transistor 2001 immediately after the transistor 2001 is turned on and the voltage $-V_{sig}$ is applied to the signal line Si, as shown in FIG. 20C.

When the voltage applied between the source and the drain becomes high, hot carrier effect occurs and the threshold voltage is changed by degaradation of the transistors because high electric field is generated near the drain of the transistor 2001. When the channel length of the transistor become shorter in accordance with higher definition of the pixel, the tendency of degaradation of the transistors become salient particularly, and the threshold voltage changes significantly. Then, the transistor 2001 does not operate normally as a switching element by the large change of the threshold voltage, and thus display failure occurs. Thus, the high voltage between the source and the drain due to the AC drive causes reduce reliability of the display device.

A structure that a writing signal whose voltage gradually changes with time is input to a writing signal line corresponding to the foregoing signal line is described in the reference 1. However, even if the voltage applied to the signal line is changed gradually as described in reference 1, storing charge in the display element included in the pixel and a storage capacitor connected to the display element in parallel follows with delay for the change of the voltage which is applied to the signal line. Therefore, the voltage between the source and the drain of the transistor serving as a switching element can be more suppressed than that of the conventional driving methods shown in FIG. 20, but there has been room to suppress the voltage more.

Note that providing LDD (lightly doped drain) region in the transistor is effective method in suppressing hot carrier effect. However, improvement of the structure of the transistor like providing LDD region causes complication of the manufacturing steps and further variations of transistor characteristics. Therefore, there is a limitation to suppress change of the threshold voltage due to hot carrier effect by improving the structure of the transistor.

In the view of the above mentioned problem, it is an object of the present invention to provide a highly reliable display device and a driving method of the display device which can suppress to generate high electric field near the drain of the transistor used as a switching element.

The inventors thought that the level of the voltage applied between the source and the drain of the transistor can be suppressed depending on the way of application of the video signal to the signal line when the video signal is applied to the pixel. Then, they focused on a relaxation time when charge is stored in the display element of the pixel and other capacitors connected to the display element in parallel, and proposed a display device which can suppress the level of the voltage applied between the source and the drain of the transistor in the writing period by the video signal applied to the signal line being step by step changed and finally set at the desired level.

The display device of the present invention specifically includes a signal line driver circuit which can change the video signal applied to the signal line in the writing period step by step in plural times by supplying a plurality of power supply voltages. In addition, the video signal applied to the signal line is changed step by step by switching a plurality of power supply lines sequentially such that different power supply voltages are applied inside the signal line driver circuit. In this case, the signal line driver circuit includes a plurality of supply passages of power supply voltages. In addition, the signal line driver circuit includes a circuit in which the video signal is switched sequentially and supplied to the one signal line in accordance with the plurality of the power supply voltages.

Alternatively, the power supply voltage is switched not inside the signal line driver circuit, but the plurality of power supply voltages which is supplied is switched sequentially outside of the display device, so that the video signal applied to the signal line may be changed step by step in plural times.

In the present invention, absolute value of the voltage between the source and the drain of the transistor used as a switching element in the writing period can be suppressed than that of a conventional display device which is driven as shown FIG. 21 and a display device which is driven as shown in reference 1. Therefore, degaradation of the transistor due to the hot carrier effect can be prevented by suppressing the generation of high electric field near the drain of the transistor. Further, by the structure of the present invention, reliability of the switching element and furthermore reliability of the display device can be improved.

DETAILED DESCRIPTION OF THE INVENTION

Embodiment modes of the present invention will be hereinafter described with reference to the drawings. Note that the present invention can be carried out in many different modes, and it is easily understood by those skilled in the art that the mode and the detail of the invention can be variously changed without departing from the spirit and the scope thereof. Therefore, the present invention is not interpreted as being limited to the description of embodiment modes.

Figure 1A:
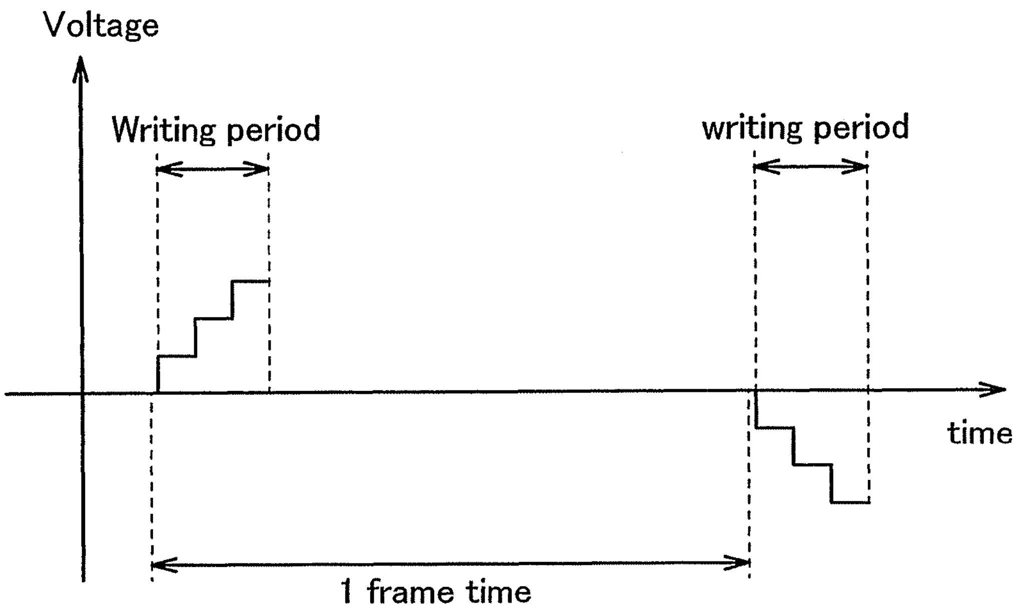
FIGS. 1A and 1B are timing charts showing a driving method of the present invention.
Figure 1B:
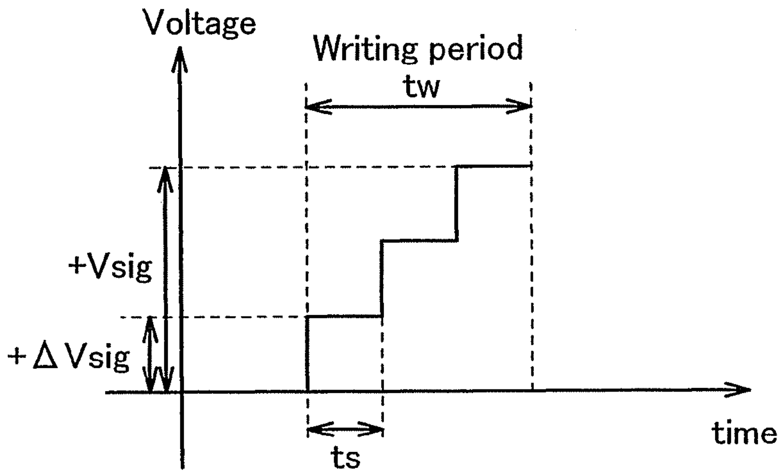

A driving method of the present invention is described with reference to FIGS. 1A and 1B. FIG. 1A is a timing chart of the voltage applied to a signal line of the present invention. In FIG. 1A, the video signal is applied to the signal line Si so that the voltage changes step by step like a stairs from the common voltage to the voltage $+V_{sig}$ in the writing period appeared first. FIG. 1B is an enlarged view of the timing chart of the writing period appeared first in FIG. 1A.

Specifically, as described in FIG. 1B, when the writing period is begun, the voltage of the signal line is change by $+\Delta V_{sig}$ first. Note that, $|\Delta V_{sig|<|Vsig}|$ is satisfied. Then, time "ts" passes after the voltage is changed by $+\Delta V_{sig}$, the voltage of the signal line is changed by $+\Delta V_{sig}$. Note that let "tw" be the writing period, ts<tw is satisfied.

Next, when the time "ts" passes furthermore, the voltage of the signal line changes by $+\Delta V_{sig}$ again. This change is repeated, and the voltage of the signal line reaches $+V_{sig}$ finally. Then, in a writing period which appears next, the driving is performed so that the voltage of the signal line changes by $-\Delta V_{sig}$ per time "ts" as shown in FIG. 1A.

Next, in order to describe the effect of the present invention more simply, change of the voltage between the source and the drain over time in the case of conventional driving method and in the case of driving method of the present invention are compared.

First, as the conventional driving method, voltage $V_{ds}$1 between the source and the drain in the case that the predetermined voltage is applied to the signal line from the beginning in the writing period is examined. It is assumed that the video signal previously applied to the signal line is $+V_{sig}$, and $-\Delta V_{sig}$ as the video signal is applied to the signal line in the next writing period. At that time, since positive charge is emitted from the pixel electrode, and negative charge is injected to the pixel electrode, let Vp(t) be the voltage of the pixel electrode included in the display element, Vp(t) is represented by the following equation.

$$Vp(t)=V_{sig}\times e^{-t/t}-V_{sig}\times(1-e^{-t/t})=-V_{sig}\times(1-2e^{-t/t}) \quad \text{(Equation 1)}$$

Therefore, when the predetermined voltage is applied to the signal line from the beginning, voltage $V_{ds}$1 between the source and the drain is represented by the following equation 2.

$$V_{ds}1=Vp(t)-(-V_{sig})=-V_{sig}\times(1-2e^{-t/t})+V_{sig}=2\ V_{sig}\times e^{-t/t} \quad \text{(Equation 2)}$$

Bringing "t" close to infinity, it is confirmed that the voltage $V_{ds}$1 between the source and the drain becomes 0 from the equation 2. Further, from the equation 2, it is found that when "t" is 0, the voltage $V_{ds}$1 between the source and the drain becomes 2 $V_{sig}$ in the conventional driving method.

Next, as the above mentioned reference 1, the voltage $V_{ds}$2 between the source and the drain is examined in the case that the video signal applied to the signal line is changed gradually and finally set at the desired level. First, let $+V_{sig}$ be the video signal previously applied to the signal line, and let "tw" be the writing time, voltage Vs(t) of the signal line is represented by the following equation 3.

$$Vs(t)=-(V_{sig}/tw)\times t \quad \text{(Equation 3)}$$

Let Cl be a capacitance of the capacitor formed of the display element, and let Cs be a capacitance of the capacitor for holding voltage which is applied to a pair of electrodes included in the display element. Then, let Q be total charge stored in the foregoing two capacitors, the following equation 4 is satisfied.

$$Q=(Cs+Cl)\times Vp(t) \quad \text{(Equation 4)}$$

Further, let R be the wiring resistance, the next equation 5 is satisfied.

$$dQ/dt=(Cs+Cl)\times(dVp(t)/dt)=-(Vp(t)-Vs(t))/R \quad \text{(Equation 5)}$$

Next, in the case of $\tau$=(Cs+Cl)×R, the equation 6 is derived from the equation 5.

$$dVp(t)/dt=-(Vp(t)-Vs(t))/\tau \quad \text{(Equation 6)}$$

Here, substituting the equation 1 into the equation 6 derives an equation 7.

$$dVp(t)/dt=-(Vp(t)+(V_{sig}/tw)\times t)/\tau \quad \text{(Equation 7)}$$

Differentiating the equation 7 with respect to "t", and setting dVp(t)/dt=F(t), the equation 8 is derived.

$$dF(t)/dt-(F(t)+V_{sig}/tw)/\tau \quad \text{(Equation 8)}$$

Note that since $V_{sig}$/tw is a constant, the equation 9 is satisfied.

$$dF(t)/dt=d(F(t)+V_{sig}/tw)/dt \quad \text{(Equation 9)}$$

Substituting the equation 9 into the equation 8 yields an equation 10.

$$d(F(t)+V_{sig}/tw)/dt=(F(t)+V_{sig}/tw)/\tau \quad \text{(Equation 10)}$$

Since the equation 10 represents that differentiating F(t)+ $V_{sig}$/tw yields the original function, it means that F(t)+$V_{sig}$/tw is exponential function. Thus, the following equation 11 is satisfied.

$$F(t)+V_{sig}/tw=A\times e^{-t/t}\ (A\text{ is a constant}) \quad \text{(Equation 11)}$$

Because of dVp(t)/dt=F(t), the equation 11 yields the following equation 12.

$$dVp(t)dt=A\times e^{-t/t}-V_{sig}/tw \quad \text{(Equation 12)}$$

Integrating the equation 12 derives the following equation 13.

$$Vp(t)/dt=-t\times A\times e^{-t/t}-(V_{sig}/tw)\times t \quad \text{(Equation 13)}$$

Note that, in the case of Vp(0)=$V_{sig}$, the equation 13 shows that A=−$V_{sig}$/$\tau$. Thus, substituting A into the equation 13 yields the following equation 14.

$$Vp(t)=V_{sig}\times e^{-t/t}-(V_{sig}/tw)\times t \quad \text{(Equation 14)}$$

Thus, from the equation 14, the voltage $V_{ds}$2 between the source and the drain in the reference 1 can be represented by the following equation 15.

$$V_{ds}2=Vp(t)-Vs(t)=V_{sig}\times e^{-t/t} \quad \text{(Equation 15)}$$

The equation 15 can confirm that bringing "t" close to infinity, the voltage $V_{ds}$2 between the source and the drain becomes 0. In addition, it is found when "t" is 0, the voltage $V_{ds}$2 between the source and the drain becomes $V_{sig}$ from the equation 15.

Next, as the present invention, the voltages $V_{ds}$3 and $V_{ds}$4 between the source and the drain are examined in the case that the video signal applied to the signal line is changed step by step and finally set at the desired level.

In this embodiment mode, it is assumed that the video signal applied to the signal line previously is $V_{sig}$. Then, in the writing period "tw", the voltage applied to the signal line is changed by $-\Delta V_{sig}$ per time in several times. After the voltage is changed, it is assumed that a period in which the voltage applied to the signal line next is changed by $-\Delta V_{sig}$ is "ts". Time "ts" is shorter than the writing period "tw".

First, the voltage $V_{ds}$3 between the source and the drain under 0>t>ts is examined. In the case of 0≦t≦ts, since Vs(t)=$-\Delta V_{sig}$ is satisfied, Vs(t) is constant. Thus, voltage $V_{ds}$3 is represented by the following equation 16.

$$V_{ds}3=Vp(t)-Vs(t)=Vp(t)+\Delta V_{sig} \quad \text{(Equation 16)}$$

Further, in this invention, the equation 4 is satisfied the same as the conventional driving method. Thus, let R be the wiring resistance, the following equation 17 is satisfied.

$$dQ/dt=(Cs+Cl)\times(dVp(t)/dt)=(Vp(t)+\Delta V_{sig})/R \quad \text{(Equation 17)}$$

Next, in the case of $\tau$=(Cs+Cl)×R, an equation 18 is derived from the equation 17.

$$dVp(t)/dt=-(Vp(t)+\Delta V_{sig})/\tau \quad \text{(Equation 18)}$$

Since $\Delta V_{sig}$ is a constant, an equation 19 is satisfied.

$$dVp(t)/dt=d(Vp(t)+\Delta V_{sig})/dt \quad \text{(Equation 19)}$$

Substituting the equation 19 into the equation 18 yields an equation 20.

$$d(Vp(t)+\Delta V_{sig})/dt=-(Vp(t)+\Delta V_{sig})/\tau \quad \text{(Equation 20)}$$

Since the equation 20 represents that differentiating Vp(t)+ $\Delta V_{sig}$ yields the original function, it means that Vp(t)+$\Delta V_{sig}$ is exponential function. Thus, the following equation 21 is satisfied.

$$Vp(t)+\Delta V_{sig}=B\times e^{-t/t}\ (B\text{ is a constant}) \quad \text{(Equation 21)}$$

Note that in the case of Vp(0)=$\Delta V_{sig}$, the equation 21 shows that B=$V_{sig}$+$\Delta V_{sig}$. Thus, substituting B into the equation 21 yields the following equation 22.

$$Vp(t)=-\Delta V_{sig}+(V_{sig}+\Delta V_{sig})\times e^{-t/t} \quad \text{(Equation 22)}$$

Thus, from the equation 22, the voltage $V_{ds}$3 between the source and the drain under 0≦t≦ts of the present invention is represented by the following equation 23.

$$V_{ds}3=Vp(t)-Vs(t)=(V_{sig}+\Delta V_{sig})\times e^{-t/t} \quad \text{(Equation 23)}$$

The equation 23 can confirm that bringing "t" close to infinite, the voltage $V_{ds}$3 between the source and the drain becomes 0. In addition, it is found when "t" is 0, the voltage $V_{ds}$3 between the source and the drain become $V_{sig}$+$\Delta V_{sig}$ from the equation 23.

Next, the voltage $V_{ds}$4 between the source and the drain under ts≦t≦2ts is examined. In the case of ts≦t≦2ts, since Vs(t)=$-2\Delta V_{sig}$ is satisfied, Vs(t) is a constant. Thus, the voltage $V_{ds}$4 is represented by the following equation 24.

$$V_{ds}4=Vp(t)-Vs(t)=Vp(t)+2\Delta V_{sig} \quad \text{(Equation 24)}$$

Further, in this invention, the equation 4 is satisfied the same as the conventional driving method. Thus, let R be the wiring resistance, the following equation 25 is satisfied.

$$dQ/dt=(Cs+Cl)\times(dVp(t)/dt)=-(Vp(t)+2\Delta V_{sig})/R \quad \text{(Equation 25)}$$

Next, in the case of $\tau=(Cs+Cl)\times R$, an equation 26 is derived from the equation 25.

$$dVp(t)/dt=-(Vp(t)+2\Delta V_{sig})/\tau \quad \text{(Equation 26)}$$

Since $2\Delta V_{sig}$ is a constant, an equation 27 is satisfied.

$$dVp(t)/dt=d(Vp(t)+2\Delta V_{sig})/dt \quad \text{(Equation 27)}$$

Substituting the equation 27 into the equation 26 yields an equation 28.

$$d(Vp(t)+2\Delta V_{sig})/dt=-(Vp(t)+2\Delta V_{sig})/\tau \quad \text{(Equation 28)}$$

Since the equation 28 represents that differentiating $Vp(t)+2\Delta V_{sig}$ yields the original function, it means that $Vp(t)+2\Delta V_{sig}$ is exponential function. Thus, the following equation 29 is satisfied.

$$Vp(t)+2\Delta V_{sig}=C\times e^{-t/\tau}(C \text{ is a constant}) \quad \text{(Equation 29)}$$

Note that in the case of $Vp(0)=-\Delta V_{sig}$, the equation 29 shows $C=\Delta V_{sig}$. Thus, substituting C into the equation 29, and finally replacing "t" with "t−ts" yields the following equation 30.

$$Vp(t)=2\Delta V_{sig}+V_{sig}\times e^{-(t-ts)/t} \quad \text{(Equation 30)}$$

Thus, from the equation 30, when "t" is replaced with "t−ts" finally, the voltage $V_{ds}$4 between the source and the drain under $ts<t\leqq 2ts$ of the present invention can be represented by the following equation 31.

$$V_{ds}4=Vp(t)-Vs(t)=\Delta V_{sig}\times e^{-(t-ts)/t} \quad \text{(Equation 31)}$$

The equation 31 shows that the maximum value of the voltage $V_{ds}$4 between the source and the drain under $ts<t\leqq 2ts$ of the present invention is $\Delta V_{sig}$. Then, in the case that the range of "t" is generalized by such a range that $m\times ts<t\leqq(m+1)\times ts<tw$ (note that m is an integer which is lager than 1), the voltage between the source and the drain is represented by the equation 31. Thus, when the range of "t" is $m\times ts<t\leqq(m+1)\times ts<tw$, the maximum value of the voltage between the source and the drain is $\Delta V_{sig}$.

Figure 2:
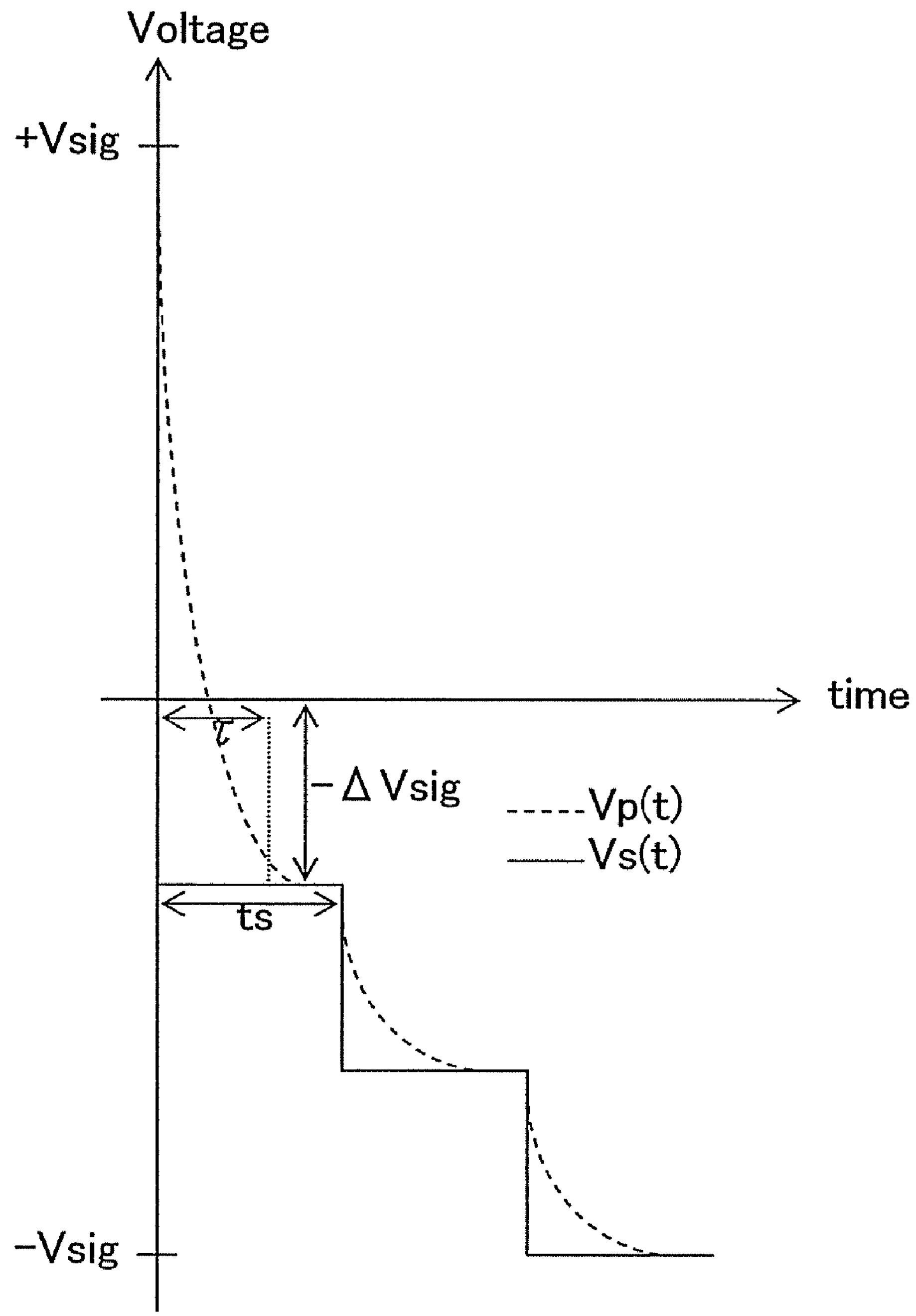
FIG. 2 is a diagram showing change in voltage applied to a signal line with time.

FIG. 2 shows time dependence of the voltage Vp(t) of the pixel electrode and the voltage Vs(t) of the signal line in the present invention. As shown in FIG. 2, when the time "ts" is set so that the time "ts" is longer than the relaxation time $\tau$ of stored charge, it is found that the voltage Vp(t) is changed in accordance with the change of the voltage Vs(t) of the signal line every time "ts".

Next, time dependence of following voltages is compared: the voltage $V_{ds}$1 between the source and the drain in the case that the predetermined voltage is applied to the signal line from the beginning by the conventional method; the voltage $V_{ds}$2 between the source and the drain in the case that the video signal applied to the signal line is changed gradually and finally set at the desired level by the method described reference 1; the voltage $V_{ds}$3 and $V_{ds}$4 between the source and the drain in the case that the video signal applied to the signal line is changed step by step and finally set at the desired level by the method of the present invention.

Figure 3:
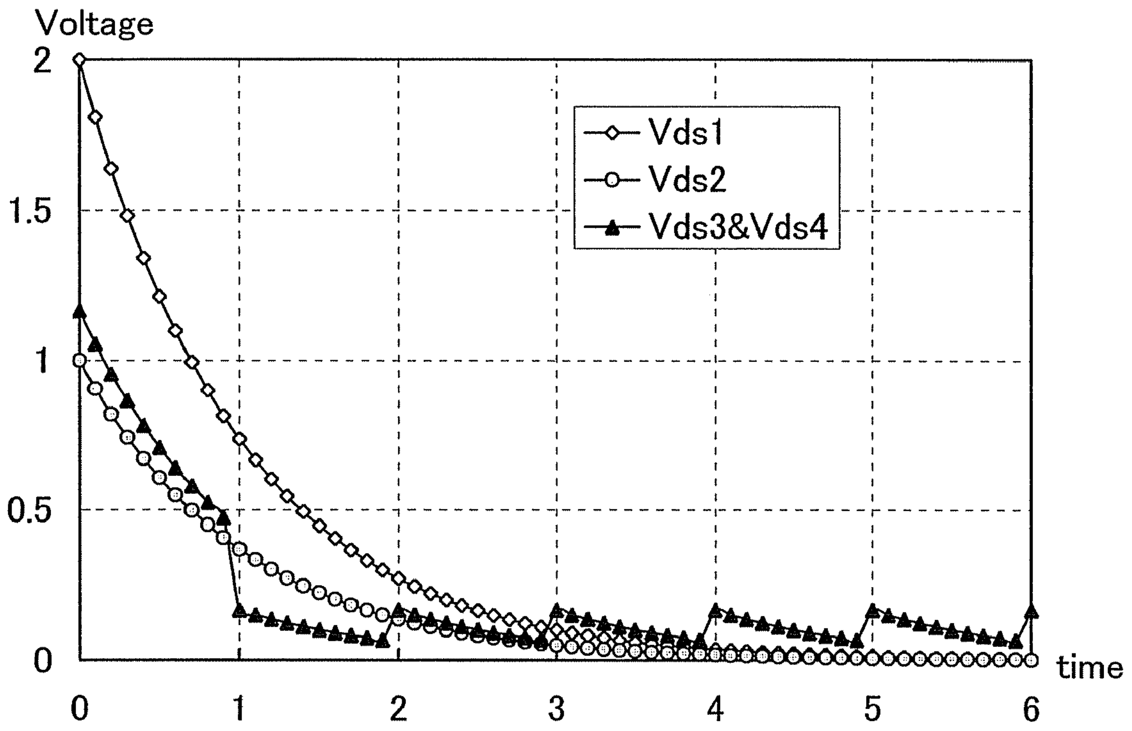
FIG. 3 is a diagram showing change in voltage between a source and a drain with time.

Note that in this embodiment mode, the following is assumed: $V_{sig}=1$, $\tau=1$, $tw/\tau=6$, $\Delta V_{sig}=1/6$, and ts=1 for simple comparison. FIG. 3 shows time dependence of the voltage between the source and the drain which is obtained using the equations 2, 15, 24, and 31 with time under the above assumption.

As known from the FIG. 3, in the case of the present invention when the voltage is changed first by $-\Delta V_{sig}$ in the writing period, the absolute value of the voltage between the source and the drain is $\Delta V_{sig}$ larger than the voltage $V_{ds}$2. However, the maximum absolute value of the voltage between the source and the drain can be more suppressed than $V_{ds}$1 and $V_{ds}$2 in the later period.

Thus, in the present invention, since the absolute value of the voltage between the source and the drain of the transistor used as a switching element can be suppressed than that of the conventional driving method in the writing period, generating high electric field near the drain of the transistor can be suppressed. Further, by the structure of the present invention, reliability of the switching element, and furthermore, reliability of the display device can be improved.

Note that FIGS. 1A and 1B illustrate the case that the voltage of the signal line is changed in three stages; however, the present invention is not limited to the structure. The voltage of the signal line may be changed in two stages, or in four stages or more.

In addition, the amount of change of the voltage in each stage is not necessarily constant. The amount of change of the voltage may be different by each stage. For example, when the voltage having different polarity from the one in present writing period is applied in the previous writing period, the voltage between the source and the drain of the transistor used as a switching element in the first stage can be suppressed more by reducing the amount of change of the voltage which is changed in the first stage of the writing period compared to that in other stages. The voltage between the source and the drain in the first stage of the writing period can be suppressed similar to the voltage between the source and the drain in the case of reference 1, in particular, by applying voltage to be a reference at the first stage, and changing the voltage applied to the signal line in the following stages.

Note that the AC drive of the present invention may be the source line inversion driving, the gate line inversion driving, the dot inversion driving, or other inversion driving methods in addition to frame inversion driving in which a video signal having the same polarity is inputted to all pixels in the given 1 frame time. The source line inversion driving is a driving method in which a video signal having the same polarity is inputted to all pixels connected to one signal line, and a video signal having the opposite polarity is inputted to pixels connected to the adjacent signal lines in the given 1 frame time. The gate line inversion driving is a driving method in which a video signal having the same polarity is input to all pixels connected to one scanning line, and a video signal having the opposite polarity is inputted to pixels connected to the adjacent scanning lines in the given 1 frame time. The dot inversion driving is a driving method in which a video signal is inputted to pixels so that each pixel can have the opposite polarity from the adjacent pixels.

[Embodiment Mode 2]

Figure 4A:
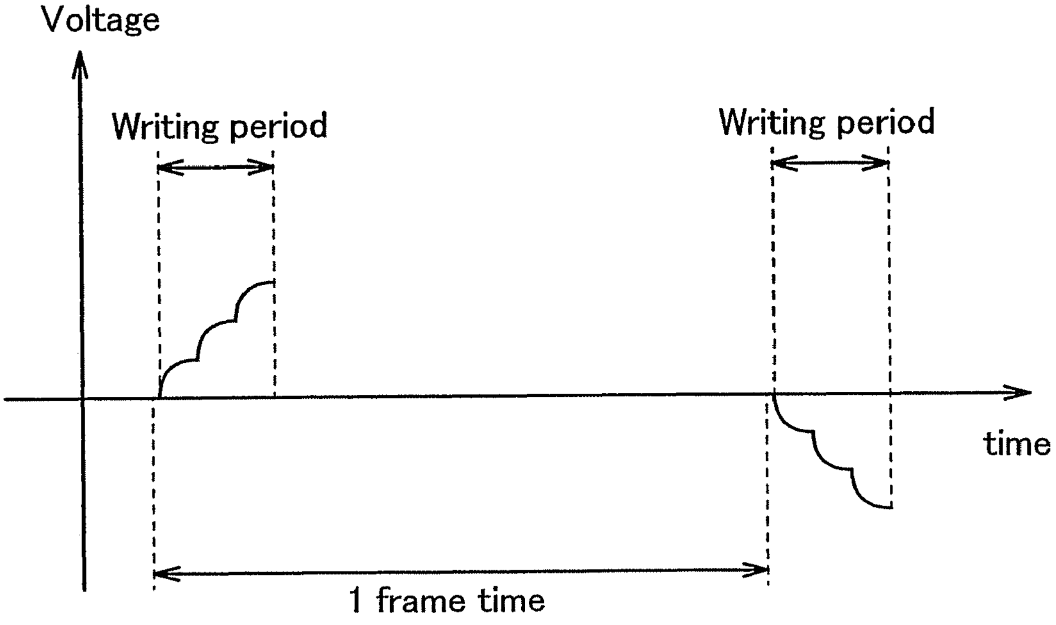
FIGS. 4A and 4B are timing charts showing a driving method of the present invention.
Figure 4B:
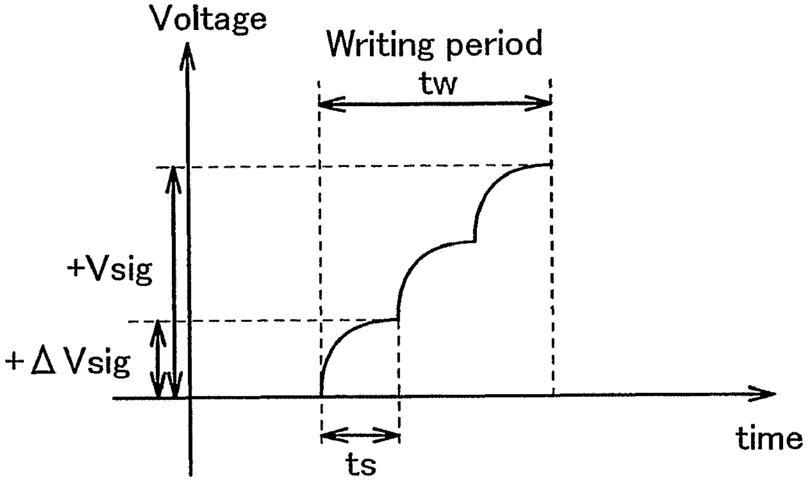

A driving method different from embodiment mode 1 is described with reference to FIGS. 4A and 4B. FIG. 4A is a timing chart of the voltage applied to the signal line of the present invention. In FIG. 4A, the video signal $+V_{sig}$ is applied to the signal line Si step by step in the writing period appeared first similar to Embodiment Mode 1. FIG. 4B is an enlarged view of the timing chart of the writing period appeared first in FIG. 4A.

As shown in FIG. 4B, once the writing period is begun, the voltage of the signal line is changed by $+\Delta V_{sig}$ first. Note that, $|\Delta V_{sig}|<|V_{sig}|$ is satisfied. Then, in this embodiment mode, the voltage of the signal line is changed so that the change of charge stored in the above capacitance Cs and Cl is easy to follow the change of the voltage of the signal line. Specifically, although the voltage is risen by $+\Delta V_{sig}$ so that the waveform of the voltage is rectangle in Embodiment 1, rise of the voltage in this Embodiment is delayed by $+\Delta V_{sig}$ so that the waveform of the voltage become dull like a parabnolic shape.

Next, when the time "ts" passes after the voltage changes by only $+\Delta V_{sig}$, the voltage of the signal line is changed by +ΔVsig again. Note that let "tw" be the writing period, ts<tw is satisfied. Then, after the time "ts" passes next, the voltage of the signal line is changed by $+\Delta V_{sig}$ again in the same manner. The change is repeated, and the voltage of the signal line reaches $+V_{sig}$ finally. Note that the change of the voltage since the second stage is similar to that of the first stage so that the rise of the voltage is delayed by $+\Delta V_{sig}$, so that the waveform becomes dull.

Then, in a writing period appeared next, the driving is performed in such a way that the voltage of the signal line is changed by $-\Delta V_{sig}$ per time "ts" as shown in FIG. 4A. When the voltage is changed by $-\Delta V_{sig}$ at a time, the voltage of the signal line is changed so that the change of charge stored in the above capacitance Cs and Cl is easy to follow the change of the voltage of the signal line, the same as the voltage changes by $+\Delta V_{sig}$ at a time. Specifically, although the voltage is fallen by $-\Delta V_{sig}$ so that the waveform of the voltage is rectangle in Embodiment 1, rise of the voltage in this Embodiment is delayed by $+\Delta V_{sig}$ so that the waveform of the voltage become dull.

Next, as this embodiment mode, the voltages $V_{ds}$5 and $V_{ds}$6 between the source and the drain are examined in the case that the video signal applied to the signal line is changed step by step and finally set at the desired level.

In this embodiment mode, it is assumed that the video signal applied to the signal line previously is $+V_{sig}$. In addition, the case is examined that the waveform of the voltage applied to the signal line is delayed by storage time of charge: τ=(Cs+Cl)×R. Note that in the writing period "tw", the voltage applied to the signal line is changed by $-\Delta V_{sig}$ per time in several times. A period in which the voltage applied to the signal line next is changed by $-\Delta V_{sig}$ is set to be "ts". Time "ts" is shorter than the writing period "tw".

First, the voltage $V_{ds}$5 between the source and the drain under 0≦t≦ts is examined. In the case of 0≦t≦ts, $Vs(t)=-\Delta V_{sig}\times(1-e^{-t/t})$ is satisfied. Thus, voltage $V_{ds}$5 is represented by the following equation 32.

$$V_{ds}5=Vp(t)-Vs(t)=Vp(t)+\Delta V_{sig}\times(1-e^{-t/t}) \quad \text{(Equation 32)}$$

Further, in this invention, the equation 4 is satisfied the same as the conventional driving method. Thus, when the wiring resistance is R, the following equation 33 is satisfied.

$$dQ/dt=(Cs+Cl)\times(dVp(t)/dt)=-(Vp(t)+\Delta V_{sig}\times(1-e^{-t/t}))/R \quad \text{(Equation 33)}$$

Next, in the case of τ=(Cs+Cl)×R, an equation 34 is derived from the equation 33.

$$dVp(t)/dt-(Vp(t)+\Delta V_{sig}\times(1-e^{-t/t}))/\tau \quad \text{(Equation 34)}$$

Here, solving the equation 34 using the general solution of the differential equation of dy/db=−a×y+Q(b) being $y=e^{-ab}\times\{\int e^{ab}\times Q(b)\,db+D\}$ (D is a constant) derives an equation 35.

$$Vp(t)=-\Delta V_{sig}+(t-D)\times(\Delta V_{sig}/\tau)\times e^{-t/t} \quad \text{(Equation 35)}$$

In the case of $Vp(0)=+\Delta V_{sig}$ as the initial condition, it is found that $D=-(\tau/\Delta V_{sig})\times(\Delta V_{sig}+V_{sig})$ from the equation 35. Substituting D into the equation 35 yields the following equation 36.

$$Vp(t)=-\Delta V_{sig}+(t+(\tau/\Delta V_{sig})\times(\Delta V_{sig}+V_{sig}))\times(\Delta V_{sig}/\tau)\times e^{-t/t} \quad \text{(Equation 36)}$$

Thus, from the equations 32 and 36, $V_{ds}$5 is represented by the following equation 37.

$$V_{ds}5=Vp(t)+\Delta V_{sig}\times(1-e^{-t/t})=(t+(\tau/\Delta V_{sig})\times V_{sig})\times(\Delta V_{sig}/\tau)\times e^{-t/t} \quad \text{(Equation 37)}$$

Next, the voltage $V_{ds}$6 between the source and the drain under ts<t≦2ts is examined. In the case of ts<t≦2ts, $Vs(t)=-\Delta V_{sig}\times(1-e^{-t/t})-\Delta V_{sig}=-\Delta V_{sig}\times(2-e^{-t/t})$ is satisfied. Thus, voltage $V_{ds}$6 is represented by the following equation 38.

$$V_{ds}6=Vp(t)-Vs(t)=Vp(t)+\Delta V_{sig}\times(2-e^{-t/t}) \quad \text{(Equation 38)}$$

Further, in this invention, the equation 4 is satisfied the same as the conventional driving method. Thus, let R be the wiring resistance, the following equation 39 is satisfied.

$$dQ/dt=(Cs+Cl)\times(dVp(t)/dt)=-(Vp(t)+\Delta V_{sig}\times(2-e^{-t/t}))/R \quad \text{(Equation 39)}$$

Next, in the case of τ=(Cs+Cl)×R, an equation 40 is derived from the equation 39.

$$dVp(t)/dt=-(Vp(t)+\Delta V_{sig}\times(2-e^{-t/t}))/\tau \quad \text{(Equation 40)}$$

Here, solving the equation 40 using the solution of dy/db=−a×y+Q(b) being $y=e^{-ab}\times\{\int e^{ab}\times Q(b)\,db+E\}$ (E is a constant) derives an equation 41.

$$Vp(t)=-(\Delta V_{sig}/\tau)\times e^{-t/t}\{2\tau\times e(t/\tau)-t+E\} \quad \text{(Equation 41)}$$

In the case of $Vp(0)=-\Delta V_{sig}$ as the initial condition, it is found that E=−τ from the equation 41. Substituting E into the equation 41, and finally replacing "t" with "t−ts" yields the following equation 42.

$$Vp(t)=-(\Delta V_{sig}/\tau)\times e^{-(t-ts)/t}\{2\tau\times e((t-ts)/\tau)-(t-ts)-\tau\} \quad \text{(Equation 42)}$$

Thus, from the equation 38 and 42, when "t" is replaced with "t−ts", the $V_{ds}$6 can be represented by the following equation 43.

$$V_{ds}6=Vp(t)+\Delta V_{sig}\times(2-e^{-(t-ts)/t})=((t-ts)/\tau)\times\Delta V_{sig}\times e^{-(t-ts)/t} \quad \text{(Equation 43)}$$

Note that when the range of "t" is generalized as m×ts<t≦(m+1)×ts<tw (note that m is an integer which is larger than 1), the voltage between the source and the drain is represented by the equation 43.

Figure 5:
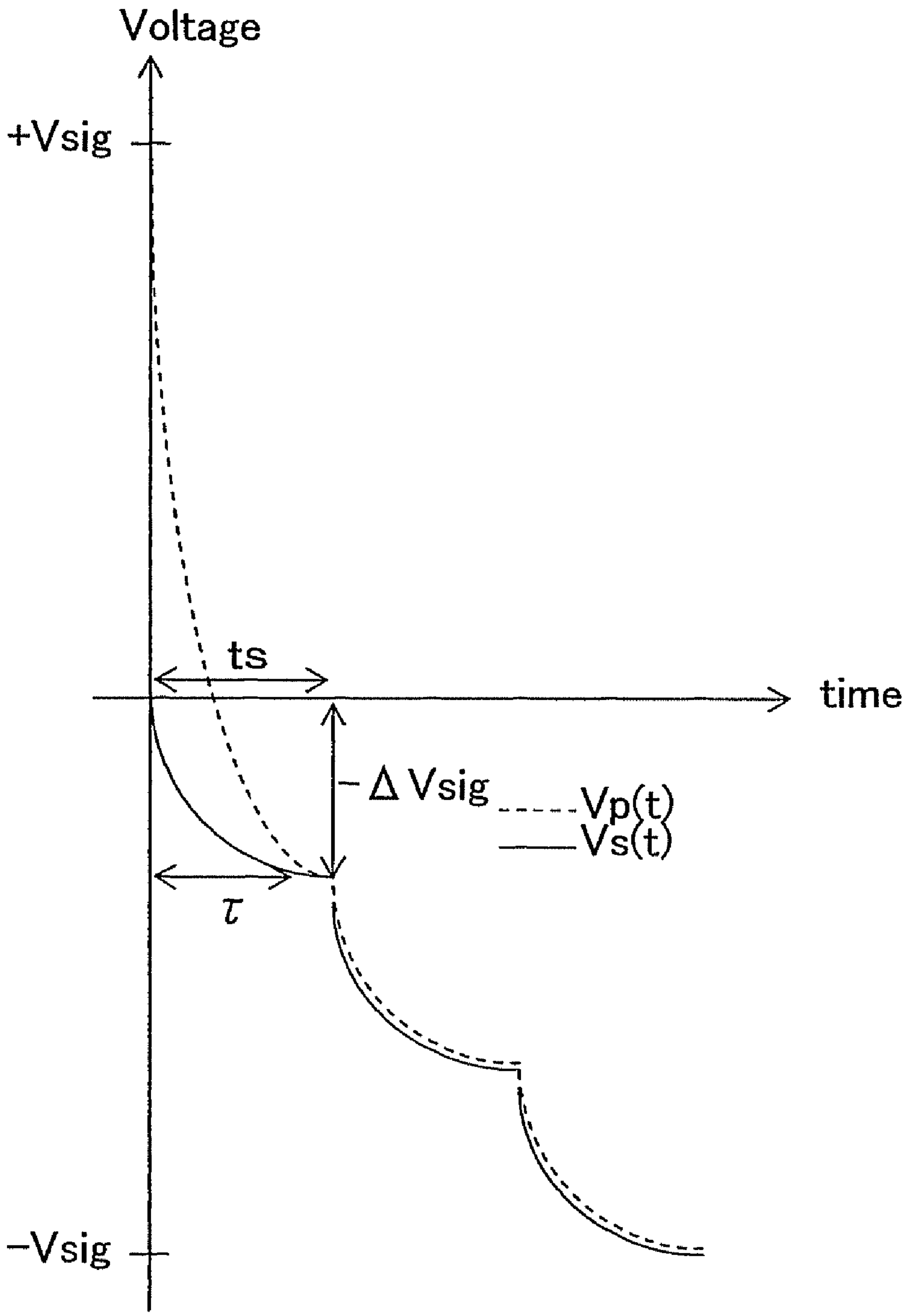
FIG. 5 is a diagram showing change in voltage applied to a signal line with time.

FIG. 5 shows time dependence of the voltage Vp(t) of the pixel electrode and the voltage Vs(t) of the signal line. As shown in FIG. 5, when the waveform of the voltage applied to the signal line is delayed by storage time: τ=(Cs+Cl)×R, it is found that the voltage Vp(t) is changed in accordance with the change of the voltage Vs(t) of the signal line per time "ts" more significantly than in the case of Embodiment Mode 1.

Next, time dependence of following voltages is compared: the voltage $V_{ds}$1 between the source and the drain in the case that the predetermined voltage is applied to the signal line from the beginning by the conventional method; the voltage $V_{ds}$2 between the source and the drain in the case that the video signal applied to the signal line is changed gradually and finally set at the desired level by the method described in reference 1; the voltage $V_{ds}$5 and $V_{ds}$6 between the source and the drain in the case that the video signal applied to the signal line is changed step by step and finally set at the desired level by the method of the present invention.

Figure 6:
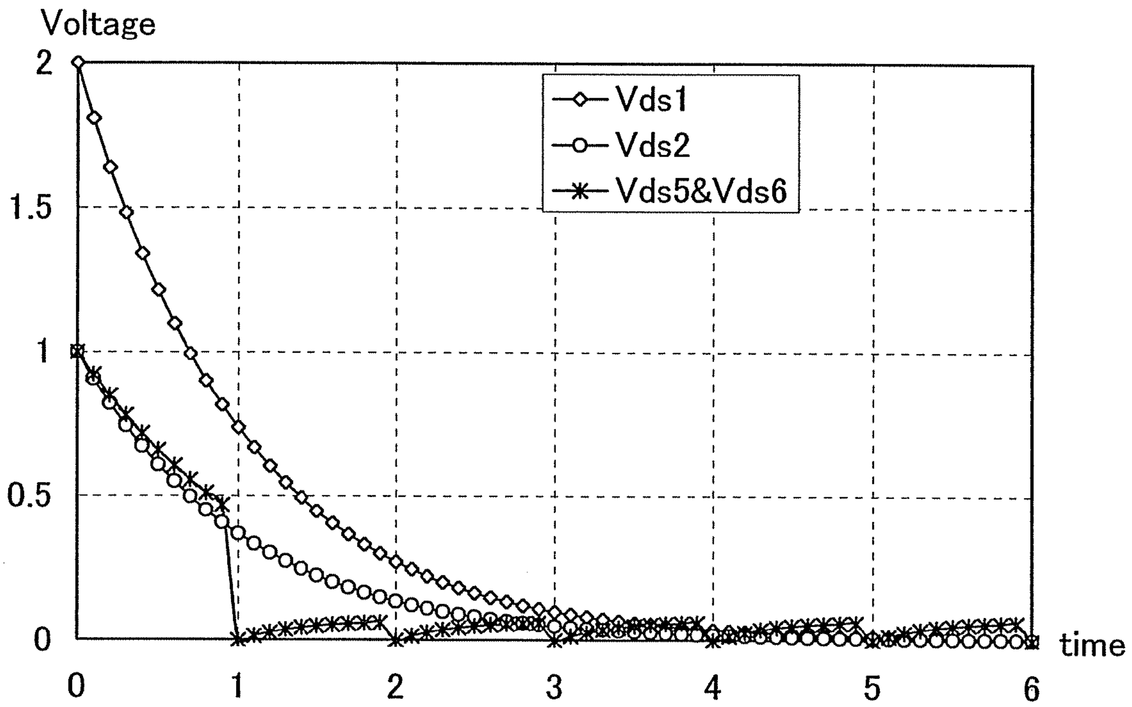
FIG. 6 is a diagram showing change in voltage between a source and a drain with time.

Note that in this embodiment mode, the following is set: that $V_{sig}=1$, τ=1, tw/τ=6, $\Delta V_{sig}=1/6$, and ts=1 for simple comparison. FIG. 6 shows time dependence of change of the voltage between the source and the drain which is obtained using the equations 2, 15, 37, and 43 under the above condition.

As known from the FIG. 6, in the case of $V_{ds}$5 and $V_{ds}$6 in this embodiment mode, when the voltage is changed first by $-\Delta V_{sig}$ in the writing period, the absolute value of $V_{ds}$5 and $V_{ds}$6 are almost the same as that of $V_{ds}$1 and $V_{ds}$2. However, the maximum value of $V_{ds}$5 and $V_{ds}$6 can be more suppressed than $V_{ds}$1 and $V_{ds}$2 in the later period.

Note that FIGS. 4A and 4B illustrate the case that the voltage of the signal line is changed in three stages; however, the present invention is not limited to the structure. The voltage of the signal line may be changed in two stages, or in four stages or more.

In addition, change of the voltage in each stage is not necessarily constant. Change of the voltage may be different by each stage. For example, when the voltage having different polarity from the one in present writing period is applied in the previous writing period, the voltage between the source and the drain of the transistor used as a switching element in the first stage can be suppressed more by reducing the change of the voltage which is changed in the first stage of the writing period than the change in other stages. The voltage between the source and the drain in the first stage of the writing period can be suppressed than the voltage between the source and the drain in the case of reference 1, in particular, by applying the voltage to be a reference at the first stage, and changing the voltage applied to the signal line in the following stages.

Thus, in the present invention, since the absolute value of the voltage between the source and the drain of the transistor used as a switching element can be suppressed than that of the conventional driving method in the writing period, generating high electric field near the drain of the transistor can be suppressed. Further, by the structure of the present invention, reliability of the switching element, and furthermore, reliability of the display device can be improved.

Note that the AC drive of the present invention may be the source line inversion driving, the gate line inversion driving, the dot inversion driving, or other inversion driving methods in addition to frame inversion driving in which a video signal having the same polarity is inputted to all pixels in the given 1 frame time. The source line inversion driving is a driving method in which a video signal having the same polarity is inputted to all pixels connected to one signal line, and a video signal having the opposite polarity is inputted to pixels connected to the adjacent signal lines in the given 1 frame time. The gate line inversion driving is a driving method in which a video signal having the same polarity is inputted to all pixels connected to one scan line, and a video signal having the opposite polarity is inputted to pixels connected to the adjacent scan lines in the given 1 frame time. The dot inversion driving is a driving method in which a video signal is inputted to pixels so that each pixel can have the opposite polarity from the adjacent pixels.

[Embodiment Mode 3]

This embodiment mode will describe a specific calculation of relaxation time of charge accumulation.

The relaxation time $\tau$ is calculated when it is assumed that the wiring resistance is negligible small in a pixel, and the resistance R in the pixel is caused by a transistor used as a switching element. Since the transistor for switching is operated in the linear region mode, the resistance in the channel formation region of the transistor can be represented by the following equation 44. Note that in the equation 44, Vgs and Vth represent the voltage (gate voltage) between the gate and source which is applied to the transistor and the threshold voltage, respectively. In addition, L and W represent the length of the channel and the width of the channel, respectively, $\mu$ represents the mobility, and $C_{ox}$ represents gate capacitance per unit area of the transistor.

$$R=1/\beta(Vgs-Vth) \text{ Note that } \beta=(L/W)\times\mu\times C_{ox} \quad \text{(Equation 44)}$$

Next, when it is assumed that the capacity in the pixel corresponds to the capacity of the liquid crystal, the capacitance Cp of the pixel is represented by the following equation 45. Note that in the equation 45, $\in_0$ and $\in_{liq}$ represents the vacuum dielectric constant and the relative dielectric constant of the liquid crystal, respectively. In addition, $t_{liq}$ represents a thickness of the liquid crystal, and S represents the area of the pixel electrode.

$$Cp=(\in_0\times\in_{liq}\times t_{liq})\times S \quad \text{(Equation 45)}$$

Next, a liquid crystal panel which includes transistors serving as switching elements using amorphous silicon is given as example, and general values of L/W, $\mu$, $C_{ox}$, Vgs, Vth, $\in_{liq}$, $t_{liq}$, S, and R of the transistor are set, and the relaxation time $\tau$ is calculated. Specifically, L/W=10/10 μm, $\mu$=0.5 cm$^2$/Vsec, $C_{ox}$=1.8×10$^{-4}$ F (it is supposed that the gate insulating film is a silicon nitride film having a thickness of equivalent to 300 nm), Vgs=10 V, Vth=5 V, $\in_{liq}$=8, $t_{liq}$=6 μm, and S=150×150 μm.

Thus, the relaxation time $\tau$=Cp×R=2.6×10$^{-13}$×2.2×10$^{7}$ sec=5.7×10$^{-16}$ sec is satisfied. Supposing VGA (480×640 pixels) , when 1 frame time is 1/60 sec, 1 horizontal period (a time needed for writing one row line)) is 1/60/480=3.5×10$^{-5}$ sec, and this 1 horizontal period is the possible maximum value of the writing period "tw". Ts>$\tau$ should be satisfied in order to store the capacitor with charge in accordance with the voltage of the signal line, and the number of possible divisions of the steps can be given by tw/$\tau$. In the above example, in the case of tw=3.5×10$^{-5}$ sec, the number of division of steps of the writing period=tw/$\tau$=3.5×10$^{-5}$/(5.7×10$^{-6}$)≈6 is obtained. Thus, when the voltage of the signal line is 5 V, the step voltage $\Delta V_{sig}$ is 5/6=0.83 V.

[Embodiment Mode 4]

Figure 7A:
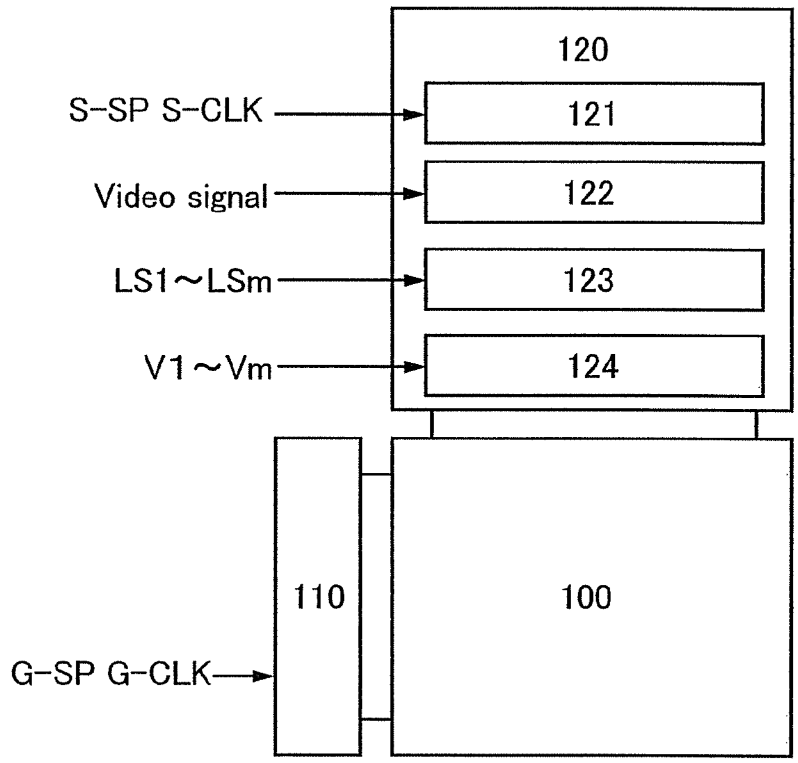
FIGS. 7A and 7B are block diagrams showing a structure of a display device of the present invention.

In this embodiment mode, a structure of a display device of the invention is described. FIG. 7A is a block diagram of a display device in this embodiment mode. The display device shown in FIG. 7A includes a pixel portion 100 which includes a plurality of pixels each provided with a display element, a scanning line driver circuit 110 which selects the pixels per line, and a signal line driver circuit 120 which controls input of video signals to the pixels in a selected line.

In FIG. 7A, the signal line driver circuit 120 includes a shift register 121, a first latch 122, a second latch 123, and a level shifter 124. The clock signal S-CLK, the start pulse signal S-SP, and the scanning direction switching signal L/R are inputted to the shift register 121. The shift register 121 generates a timing signal, pulses of which are sequentially shifted, in accordance with the clock signal S-CLK and the start pulse signal S-SP and outputs the timing signal to the first latch 122. The appearance order of the pulses of the timing signal is switched by the scanning direction switching signal L/R.

When the timing signal is inputted to the first latch 122, a video signal is sequentially written to a plurality of storage elements included in the first latch 122 in accordance with the pulses of the timing signal and held therein. Note that when it is assumed that the number of the signal line is x, and the voltage applied to the signal line is changed in m stages, the storage elements included in the first latch 122 is x×m at least. Further, a video signal having the same image information is inputted to m storage elements corresponding to the same signal line.

Note that in this embodiment mode, video signals are sequentially written to a plurality of storage elements included in the first latch 122; however, the invention is not limited to this structure. So-called division driving may be performed in which a plurality of storage elements included in the first latch 122 are divided into several groups and video signals are inputted to each group at the same time. Note that the number of groups in this case is referred to as the number of divisions. For example, when latch is divided into groups each having four storage element, division driving is performed with a divisions number four.

The time it takes to terminate a series of writing of video signals to all of the storage elements in the first latch 122 is referred to as a horizontal period (line period). The fact of the matter is that a period in which a horizontal retrace interval has been added to the horizontal period is referred to as a horizontal period in some cases.

When it is assumed that the number of the signal line is x, and the voltage applied to the signal line is changed in m stages, the second latch 123 has x×m storage elements at least. When one horizontal period terminates, the video signal held in the first latch 122 is written to the second latch 123 and held therein in accordance with pulses of latch signals LS1 to LSm input to the second latch 123. In the first latch 122 which finishes transmitting the video signals to the second latch 123, the next video signal is sequentially written in accordance with the timing signal from the shift register 121 again.

Note that pulses of the latch signals LS1 to LSm are shifted sequentially. Therefore, when m storage elements corresponding to the same signal line included in the second latch 123 are focused on, the video signal from the first latch 122 is input to the m the storage elements sequentially. Thus, the video signal stored in each of m storage elements in the second latch 123 is input to the level shifter 124 in accordance with the order of written from the first latch 122.

The power supply voltages V1 to Vm in addition to the common power supply voltage such as the ground (GND) or the like are supplied to the level shifter 124 via a supply passage such as a power supply line. Then, after the video signal written in the second latch 123 is adjusted in accordance with the power supply voltages V1 to Vm in the level shifter 124, the video signal is input to the pixel portion 100 via the signal line.

Note that in this embodiment mode, the video signal stored in each of m storage elements in the second latch 123 is to be sequentially input to the same signal line via the level shifter 124. Then, since each video signal is adjusted in accordance with the power supply voltages V1 to Vm, the voltage applied to each signal line in the writing period can be changed sequentially in accordance with the power supply voltages V1 to Vm. Thus, the level shifter 124 corresponds to a circuit in which the video signal is sequentially switched in accordance with the power supply voltage which is supplied, and the voltage is supplied to the pixel portion.

Note that in the signal line driver circuit 120, a circuit which can output a signal, pulses of which are sequentially shifted, may be used instead of the shift register 121.

Note that in FIG. 7A, the pixel portion 100 is directly connected to the next portion of the level shifter 124; however, the invention is not limited to this structure. A circuit which processes the video signal output from the level shifter 124 can be provided in the previous portion of the pixel portion 100. Examples of a circuit which processes signal include a buffer which can shape a waveform, a digital/analog converter circuit which can convert a digital signal into an analog signal, and the like.

Next, a structure of the scan line driver circuit 110 is described. The scan line driver circuit 110 includes a shift register 111. In the scan line driver circuit 110, the clock signal G-CLK, the start pulse signal G-SP, and the scan direction switching signal L/R are input to the shift register; thus, a selection signal, pulses of which are sequentially shifted, is input to the pixel portion 100 through a scan line. The appearance order of the pulses of the selection signal is switched by the scan direction switching signal L/R. The pulse of the generated selection signal is input to a scan line, so that pixels in the scan line are selected, and a video signal is input to the pixel.

Note that in the scan driver circuit 110, the pixel portion 100 may be directly connected to the next portion of the shift register, or a circuit which processes the selection signal output from the shift register may be provided in the previous portion of the pixel portion 100. Examples of a circuit which processes the signal include a buffer which can shape a waveform, a level shifter which can amplify amplitude, and the like.

Note that FIG. 7A shows a structure in which m video signals input in the same signal line in one writing period are adjusted in the level shifter 124 in accordance with the power supply voltages V1 to Vm; however, the present invention is not limited to the structure. The level shifter 124 is not necessarily provided. For example, the video signal may be adjusted in accordance with the power supply voltages V1 to Vm in the second latch 123.

Figure 7B:
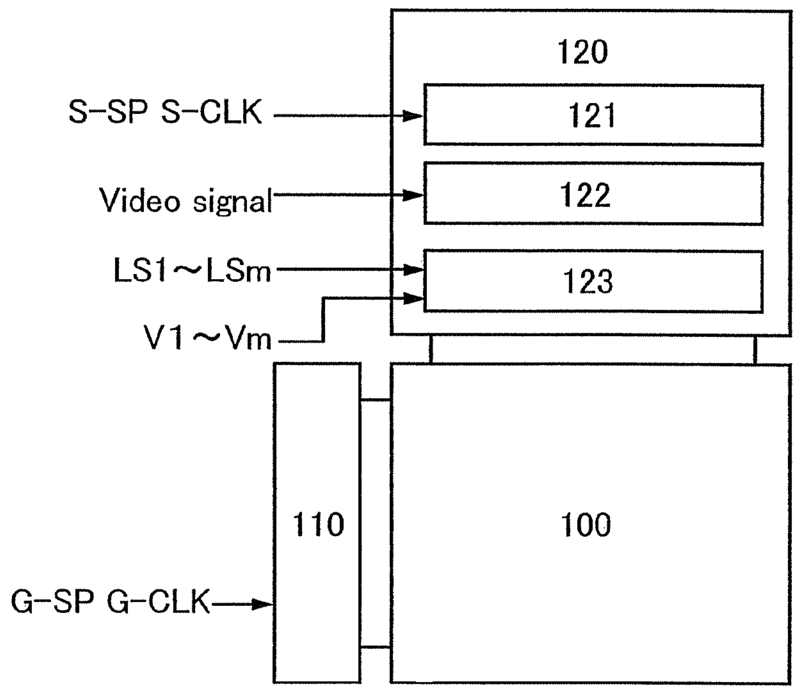

FIG. 7B shows one exemplary structure of a display device of the present invention which does not include a level shifter. In FIG. 7B, the power supply voltages V1 to Vm are supplied to the second latch 123 via a supply passage such as a power supply line. Then, after the video signal is adjusted in accordance with the power supply voltages V1 to Vm in the second latch 123, the video signal is input to the pixel portion 100 via the signal line.

Note that since each video signal is adjusted in accordance with the power supply voltages V1 to Vm, the voltage applied to each signal line in the writing period can be changed sequentially in accordance with the power supply voltages V1 to Vm. Thus, the second latch 123 corresponds to a circuit in which the power supply voltage which is supplied is switched, and the voltage is supplied to the pixel portion as a video signal.

In addition, the case that the digital video signal is input to the signal line is described in FIGS. 7A and 7B; however, the present invention is not limited to the structure.

Figure 8:
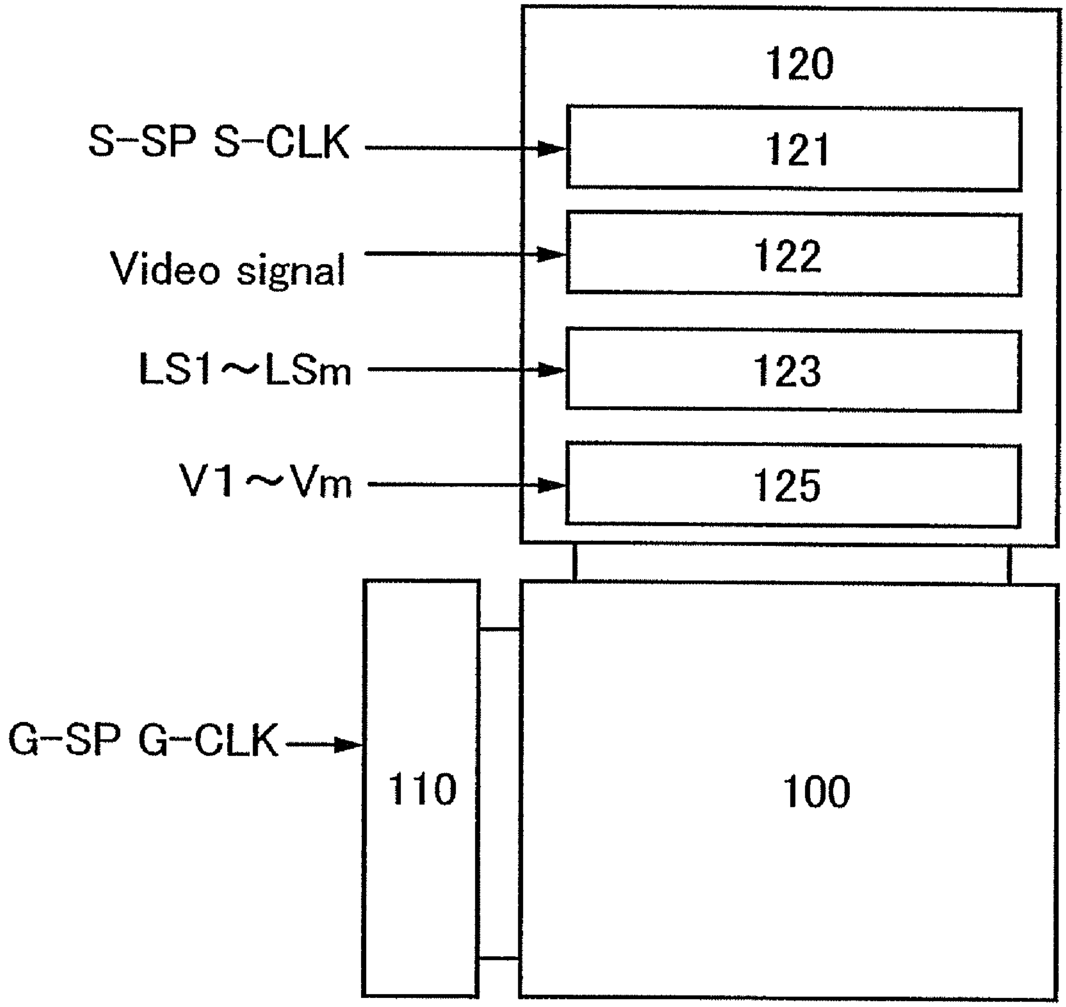
FIG. 8 is a block diagram showing a structure of a display device of the present invention.

FIG. 8 shows one exemplary structure of a display device of the present invention in the case that an analog video signal is input to the signal line. In FIG. 8, a DA conversion circuit 125 is provided in the next portion of the second latch 123. Then, the power supply voltages V1 to Vm are supplied to the DA conversion circuit 125 via a supply passage such as a power supply line. Then, after the voltage of the digital video signal which is input to the DA conversion circuit 125 is adjusted in accordance with the power supply voltages V1 to Vm and is converted into the analog signal in the DA conversion circuit 125, and the analog signal is input to the pixel portion 100 via the signal line.

Since the voltage of each video signal is adjusted in accordance with the power supply voltages V1 to Vm, the voltage of the video signal applied to the signal line in the writing period can be changed sequentially in accordance with the power supply voltages V1 to Vm. Thus, the DA conversion circuit 125 corresponds to a circuit in which the power supply voltage which is supplied is switched, and the voltage is supplied to the pixel portion as a video signal.

In the display device of FIGS. 7A, 7B, and 8 shows structures which use a scan direction switching signal L/R; however, the present invention is not limited to the structure. When the scan direction is not switched, the scan direction switching signal L/R is not necessarily used.

In addition, a circuit which processes the video signal may be provided at the previous portion of display portion 100 in the display device of FIGS. 7A, 7B, and 8. Examples of a circuit which processes signal include a buffer which can shape a waveform and the like.

Note that in this embodiment mode, a structure of a display device in which the polarity of the power supply voltages V1 to Vm is reversed per 1 frame time is described. However, the structure of the present invention is not limited to the structure. The plurality of the power supply voltages V1 to Vm and the plurality of power supply voltages −V1 to −Vm which have opposite polarity each other may be applied to the signal line driver circuit in advance.

Note that as shown in embodiment mode 3, when the display device desired to be driven so that the waveform of the voltage applied to the signal line becomes dull, the driving method can be realized by adjusting the power supply voltage or the voltage of various signals applied to the signal line driver circuit as appropriately; alternatively, a circuit such as a multiplication circuit in which the waveform become dull may be provided in the signal line driver circuit.

This embodiment mode can be implemented in combination with embodiment modes above mentioned.

[Embodiment 1]

This embodiment will describe a structure of a pixel included in an active matrix liquid crystal display device which is one display device of the present invention.

Figure 9:
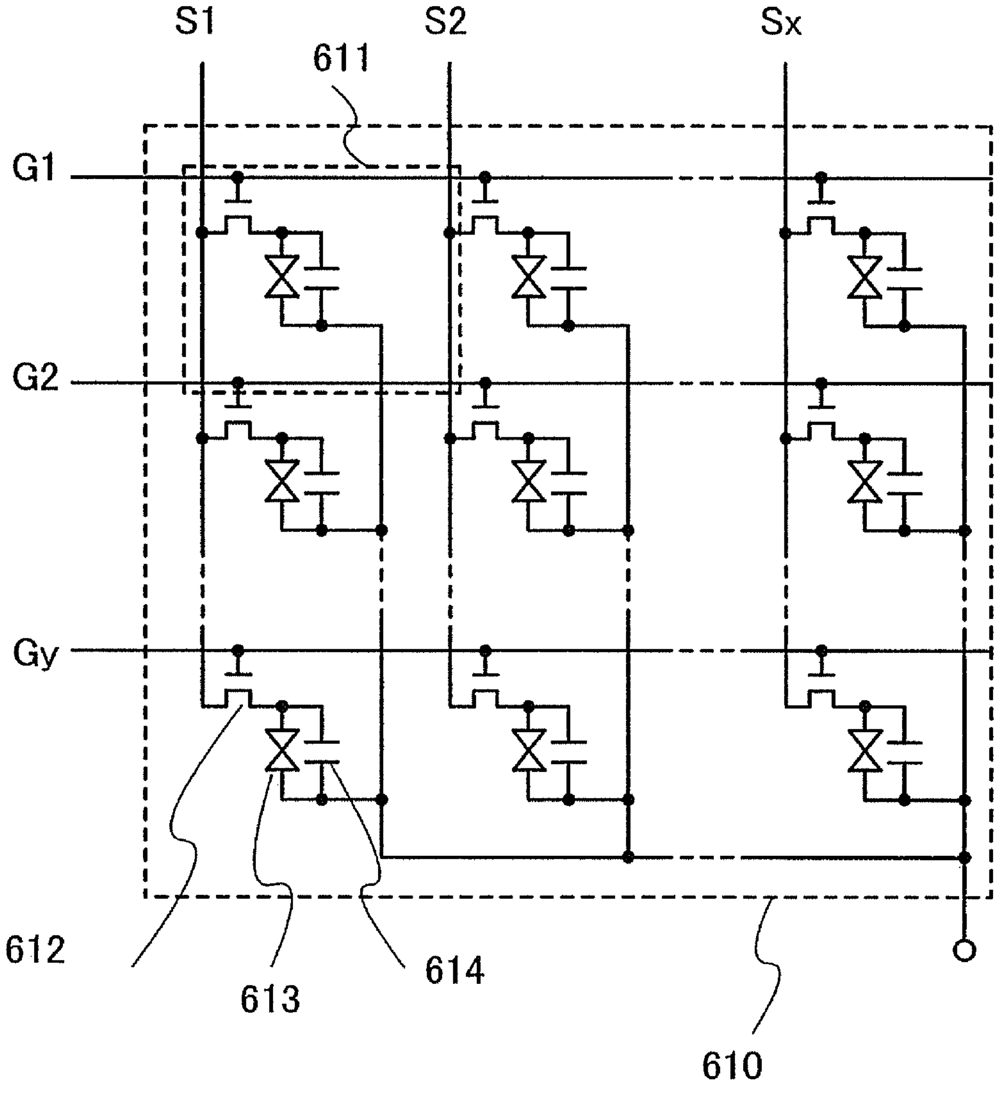
FIG. 9 is a diagram showing a structural pixel portion of a display device of the present invention.

FIG. 9 is an enlarged view of a pixel portion 610 of a display device of this embodiment. In FIG. 9, a plurality of pixels 611 are provided in matrix in the pixel portion 610. In addition, S1 to Sx corresponds to signal lines, and G1 to Gy corresponds to scan lines. In the case of this embodiment, each pixel 611 includes one of the signal lines S1 to Sx and one of the scan lines G1 to Gy.

Each of the pixel 611 include a transistor 612 serving as a switching element, a liquid crystal cell 613 corresponding to a display element, and a storage capacitor 614. The liquid crystal cell 613 includes a pixel electrode, a counter electrode, and liquid crystal to which voltage is applied by the pixel electrode and the counter electrode. The gate of the transistor 612 is connected to the scan line Gj (j=1 to y), and one of the source and drain is connected to the signal line Si (i=1 to x), the other of the source and drain is connected to the pixel electrode of the liquid crystal cell 613. In addition, one electrode of the storage capacitor 614 which has two electrodes is connected to the pixel electrode of the liquid crystal cell 613 and the other electrode is connected to a common electrode. The common electrode may be connected to the counter electrode of the liquid crystal cell 613 or may be connected to another scan line.

When the scan line Gj is selected in accordance with pulses of a selection signal input to the scan lines G1 to Gy from the scan line driver circuit, in other words, when the pixels 611 of a line corresponding to the scan line Gj are selected, the transistor 612, the gate of which is connected to the scan line Gj, in the pixels 611 of the line is turned on. Then, when a video signal is input to the signal line Si from the signal line driver circuit, voltage is applied between the pixel electrode and the counter electrode of the liquid crystal cell 613 in accordance with the video signal. The transmittance of the liquid crystal cell 613 is determined in accordance with the value of voltage applied between the pixel electrode and the counter electrode. The voltage between the pixel electrode and the counter electrode of the liquid crystal cell 613 is held in the storage capacitor 614.

This embodiment mode can be implemented in combination with embodiment modes above mentioned.

[Embodiment 2]

This embodiment will describe a structure of a pixel portion included in an active matrix light-emitting device, which is on of the display device of the invention.

In the active matrix light-emitting device, each pixel is provided with a light-emitting element which corresponds to a display element. Since the light-emitting element emits light by itself, it has high visibility and is optimal for reduction in thickness because a backlight required in a liquid crystal display device is not necessary. Further, the light-emitting element has no limitation on viewing angles. In this embodiment, a light-emitting device using an organic light-emitting diode (OLED), which is one of the light-emitting element, is described; however, the invention may also include a light-emitting device using another light-emitting element.

The OLED includes a layer containing a material from which luminescence (electroluminescence) generated by application of an electric field can be obtained (hereinafter, referred to as an electroluminescent layer), an anode layer, and a cathode layer. As electroluminescence, there are luminescence (fluorescence) at the time of returning to a ground state from a singlet-excited state and luminescence (phosphorescence) at the time of returning to a ground state from a triplet-excited state. In a light-emitting device of the invention, one or both of fluorescence and phosphorescence may be used.

Figure 10A:
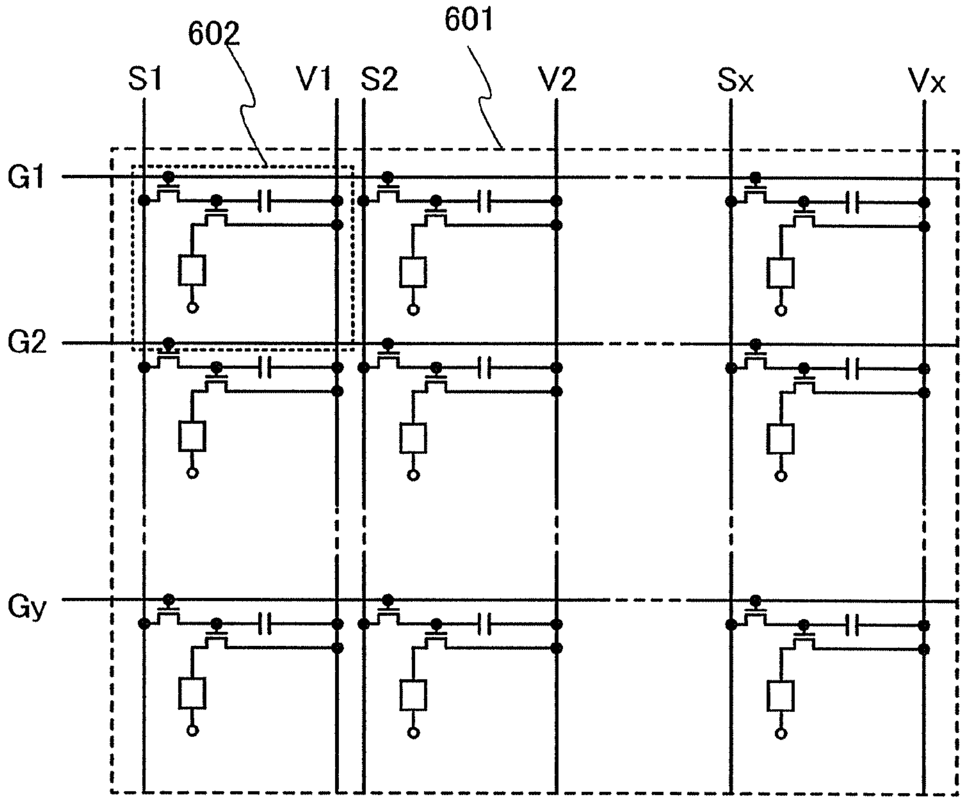
FIGS. 10A and 10B are diagrams showing a structural pixel portion of a display device of the present invention.

FIG. 10A is an enlarged view of a pixel portion 601 of a light-emitting device in this embodiment. The pixel portion 601 includes a plurality of pixels 602 arranged in matrix. Reference signs S1 to Sx denote signal lines, reference signs V1 to Vx denote power supply lines, and reference signs G1 to Gy denote scan lines. In this embodiment, each pixel 602 includes one of the signal lines S1 to Sx, one of the power supply lines V1 to Vx, and one of the scan lines G1 to Gy.

Figure 10B:
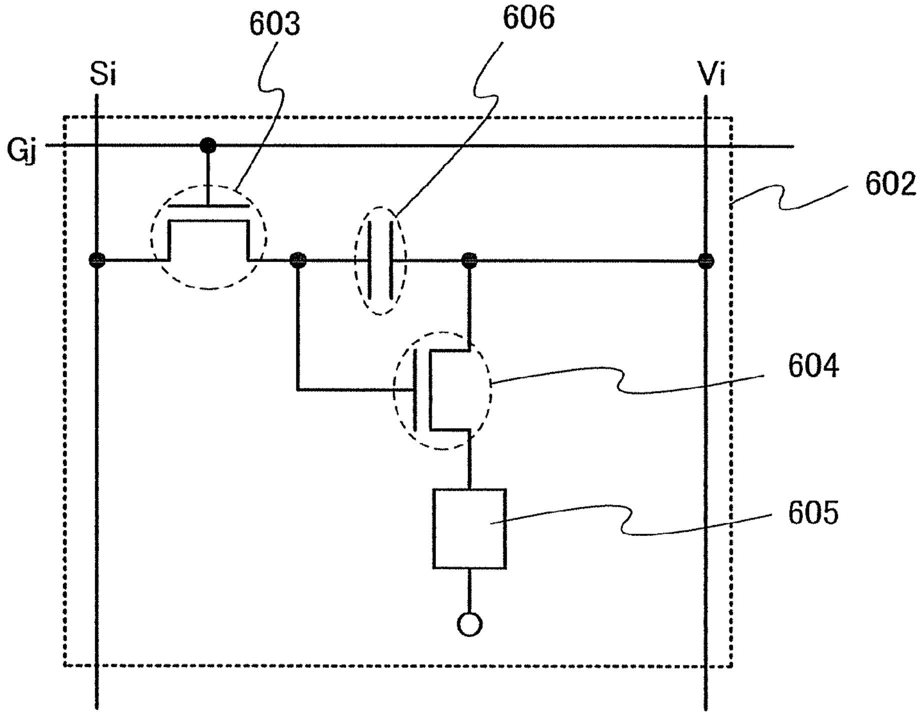

FIG. 10B is an enlarged view of the pixel 602. In FIG. 10B, reference numeral 603 denotes a switching transistor. A gate of the switching transistor 603 is connected to the scan line Gj. One of a source and a drain of the switching transistor 603 is connected to the signal line Si (i=1 to x). The other of the source and the drain of the switching transistor 603 is connected to a gate of a driving transistor 604. A storage capacitor 606 is provided between the power supply line Vi (i=1 to x) and the gate of the driving transistor 604.

The storage capacitor 606 is provided to hold gate voltage (voltage between the gate and a source) of the driving transistor 604 when the switching transistor 603 is off. Note that the structure in which the storage capacitor 606 is provided is described in this embodiment, the invention is not limited to this structure, and the storage capacitor 606 is not necessarily provided.

One of the source and a drain of the driving transistor 604 is connected to the power supply line Vi (i=1 to x). The other of the source and the drain of the driving transistor 604 is connected to a light-emitting element 605. The light-emitting element 605 includes an anode, a cathode, and an electroluminescent layer provided between the anode and the cathode. When the anode is connected to the source or the drain of the driving transistor 604, the anode corresponds to a pixel electrode and the cathode corresponds to a counter electrode. On the other hand when the cathode is connected to the source or the drain of the driving transistor 604, the cathode corresponds to the pixel electrode and the anode corresponds to the counter electrode.

Predetermined voltages are applied to the counter electrode of the light-emitting element 605 and the power supply line Vi.

When the scan line Gj is selected in accordance with pulses of selection signals input to the scan lines G1 to Gy from a scan line driver circuit, that is, when the pixels 602 of a line corresponding to the scan line Gj are selected, the switching transistor 603, the gate of which is connected to the scan line Gj, in each of the pixels 602 of the line is turned on. Then, when a video signal is input to the signal line Si, the gate voltage of the driving transistor 604 is determined in accordance with the video signal. When the driving transistor 604 is turned on, the power supply line Vi and the light-emitting element 605 are electrically connected, so that the light-emitting element 605 emits light by supply of current. On the other hand when the driving transistor 604 is turned off, the power supply line Vi and the light-emitting element 605 are not electrically connected, so that current is not supplied to the light-emitting element 605 and the light-emitting element 605 does not emit light.

Note that each of the switching transistor 603 and the driving transistor 604 can be either an n-channel transistor or a p-channel transistor. Note that when the source or the drain of the driving transistor 604 is connected to the anode of the light-emitting element 605, the driving transistor 604 is preferably a p-channel transistor. Alternatively, when the source or the drain of the driving transistor 604 is connected to the cathode of the light-emitting element 605, the driving transistor 604 is preferably an n-channel transistor.

In addition, each of the switching transistor 603 and the driving transistor 604 may have a multi-gate structure such as a double-gate structure or a triple-gate structure, instead of a single-gate structure.

Note that the invention can be applied to not only a display device including pixels having the circuit structures shown in FIGS. 10A and 10B but also a display device including pixels having various circuit structures. The pixel included in the display device of the present invention may have a threshold voltage compensation circuit structure in which the threshold voltage of a driving transistor can be compensated, or a current input circuit structure in which the threshold voltage and mobility of a driving transistor can be compensated by input of current, for example.

As for the light-emitting device, the voltage applied to the display element is set to be few volts higher than that of a liquid crystal display device in many cases. Thus, there is a problem that even if AC drive is not performed, the difference of the voltage between the source and the drain of the transistor serving as a switching element easily becomes large depending on an image to be displayed. In addition, AC drive in which the voltage of reverse bias is applied to a light-emitting device per a certain period can be performed in order to increase reliability of the light-emitting device by improving deterioration of current-voltage characteristics of the light-emitting device. However, reliability of the transistor used as a switching element, and furthermore, reliability of the display device can be improved using the structure of the present invention.

This embodiment mode can be implemented in combination with other embodiment modes and embodiments.

[Embodiment 3]

In this embodiment, a specific structure of a signal line driver circuit included in the display device of the invention is described.

Figure 11:
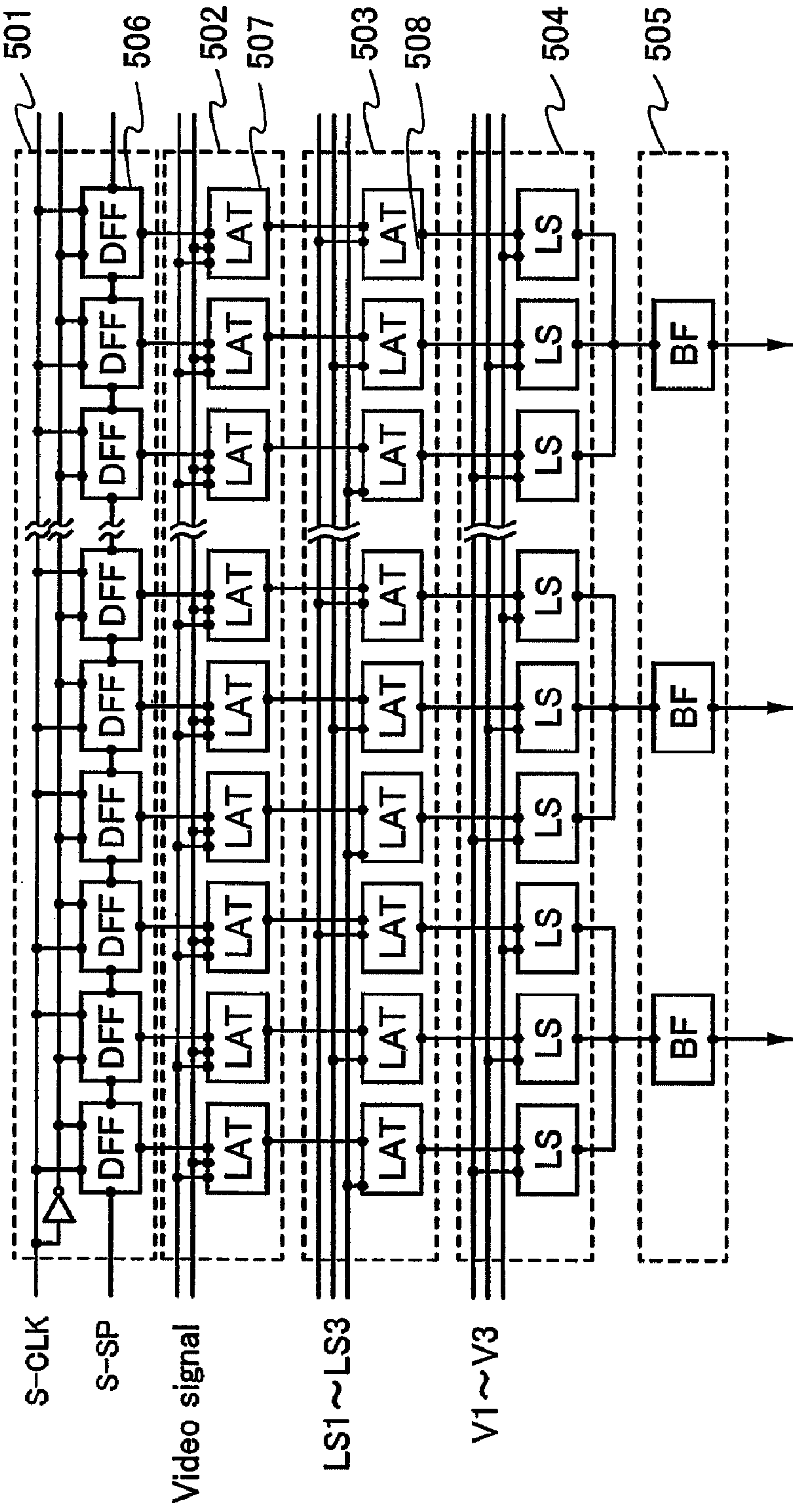
FIG. 11 is a block diagram showing a structure of a signal line driver circuit included in a display device of the present invention.

FIG. 11 shows an example of a circuit diagram of a signal line driver circuit. The signal line driver circuit shown in FIG. 11 includes a shift register 501, a first latch 502, a second latch 503, a level shifter 504, and a buffer 505.

The shift register 501 includes a plurality of delay flip-flops (DFFs) 506. The shift register 501 generates a timing signal, pulses of which are sequentially shifted, in accordance with the start pulse signal S-SP and the clock signal S-CLK input thereto and inputs the timing signal to the first latch 502 in the next portion.

When it is assumed that the number of the signal lines is x, and the voltage applied to the signal line is changed in three stages, the first latch 502 includes at least 3×x of storage elements (LATs) 507. The first latch 502 sequentially samples video signals in accordance with the pulses of the timing signal which is input thereto and writes data of the sampled video signal to the storage element 507.

When it is assumed that the number of the signal lines is x, and the voltage applied to the signal line is changed in three stages, the second latch 503 includes at least 3×x of storage elements (LATs) 508. The data of the video signal which is written to the storage element 507 by the first latch 502 is sequentially written to the storage elements 508 included in the second latch 503 in accordance with the latch signals LS1 to LS3 1, pulses of which are sequentially shifted, and held therein. Then, the data held in the storage elements 508 is output as a video signal to the level shifter 504 in the next portion.

The power supply voltages V1 to V3 in addition to the common power supply voltage are supplied to the level shifter 504 via a supply passage such as a power supply line. Then, after the video signal written in the second latch 503 is adjusted in accordance with the power supply voltages V1 to V3 in the level shifter 504, waveform is shaped in the buffer 505, and the video signal is input to the signal line.

When it is assumed that the voltage applied to the signal line is changed in m stages, since the video signal applied to the signal line is adjusted in accordance with the power supply voltages V1 to Vm, the voltage applied to each signal line in the writing period can be changed sequentially in accordance with the power supply voltages V1 to Vm. Thus, the level shifter 504 corresponds to a circuit in which the video signal is switched sequentially in accordance with the power supply voltage which is supplied, and the video signal is supplied to the pixel portion.

Note that in this embodiment, a structure of a display device in which the polarity of the power supply voltages V1 to Vm are reversed per 1 frame time is described. However, the structure of the present invention is not limited to the structure. The plurality of the power supply voltages V1 to Vm and the plurality of power supply voltages −V1 to −Vm which have opposite polarity each other can be applied to the signal line driver circuit in advance via a supply passage such as a power supply line.

This embodiment mode can be implemented in combination with embodiment modes and embodiments above mentioned.

[Embodiment 4]

In this embodiment, a specific structure of a signal line driver circuit included in the display device of the invention is described.

Figure 12:
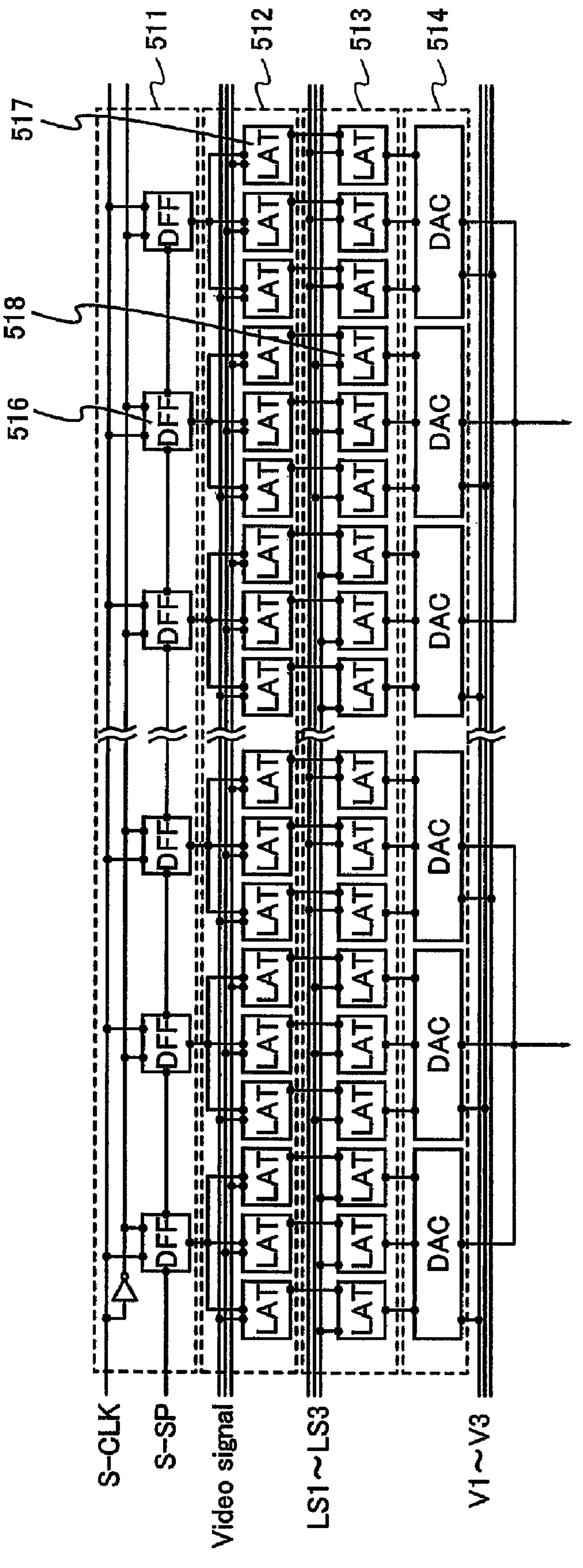
FIG. 12 is a block diagram showing a structure of a signal line driver circuit included in a display device of the present invention.

FIG. 12 shows an example of a circuit diagram of a signal line driver circuit. The signal line driver circuit shown in FIG. 12 includes a shift register 511, a first latch 512, a second latch 513, and a DA conversion circuit 514.

The shift register 511 includes a plurality of delay flip-flops (DFFs) 516. The shift register 511 generates a timing signal, pulses of which are sequentially shifted, in accordance with the start pulse signal S-SP and the clock signal S-CLK input thereto and outputs the timing signal to the first latch 512 in the next portion.

When it is assumed that the number of bit of the video signals is three, the number of the signal lines is x, and the voltage applied to the signal line is changed in three stages, the first latch 512 includes at least 3×3××x of storage elements (LATs) 517. The first latch 512 sequentially samples the video signal in accordance with the pulses of the timing signal input thereto and writes data of the sampled video signal to the storage element 517.

When it is assumed that the number of bits of the video signal is three, the number of the signal lines is x, and the voltage applied to the signal line is changed in three stages, the second latch 513 includes at least 3×3××x of storage elements (LATs) 518. The data of the video signal which is written to the storage element 517 in the second latch 512 is written to the storage elements 518 included in the second latch 513 in accordance with pulses of latch signals LS1 to LS3 which is sequentially sifted and held therein. Specifically, when the voltage is changed in m stages, the data is sequentially written to the second latch 513 per the video signal corresponding to each stage. Then, the data held in the storage elements 518 is output to the DA conversion circuit 514 of the next portion as a video signal.

The power supply voltages V1 to V3 in addition to the common power supply voltage are supplied to the DA conversion circuit 514 via a supply passage such as a power supply line. Then, after the video signal which is written in the second latch 513 is converted into an analog signal of which the voltage is adjusted in accordance with the power supply voltages V1 to V3 in the DA conversion circuit 514, the signal is input to the signal line.

When it is assumed that the voltage applied to the signal line is changed in m stages, since the voltage of the analog video signal applied to the signal line is adjusted in accordance with the power supply voltages V1 to Vm, the voltage applied to each signal line in the writing period can be changed sequentially in accordance with the power supply voltages V1 to Vm. Thus, the DA conversion circuit 514 corresponds to a circuit in which the video signal is switched sequentially in accordance with the power supply voltage which is supplied, and the video signal is supplied to the pixel portion.

This embodiment mode can be implemented in combination with embodiment modes and embodiments above mentioned.

[Embodiment 5]

Figure 13A:
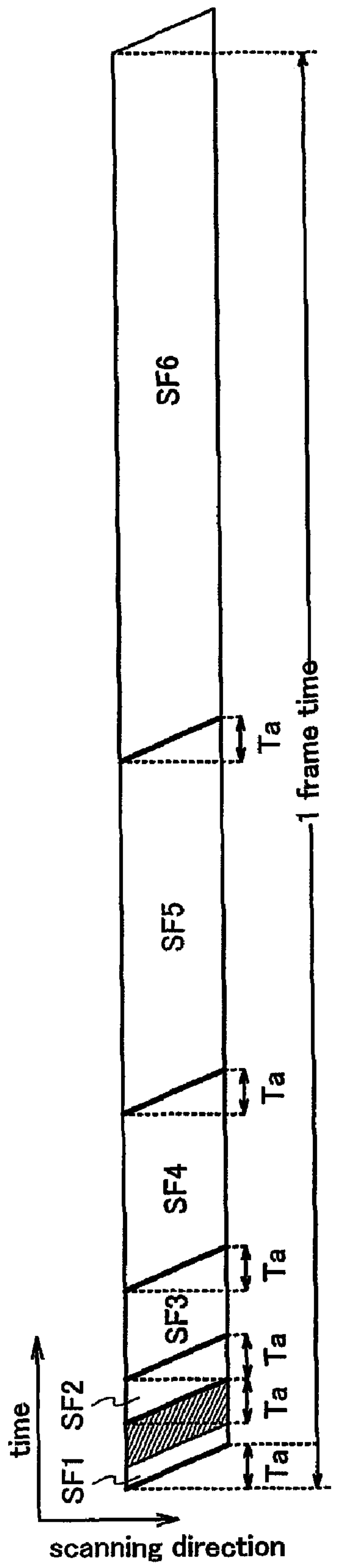
FIGS. 13A and 13B are diagrams showing the timing when a writing period appears.
Figure 13B:
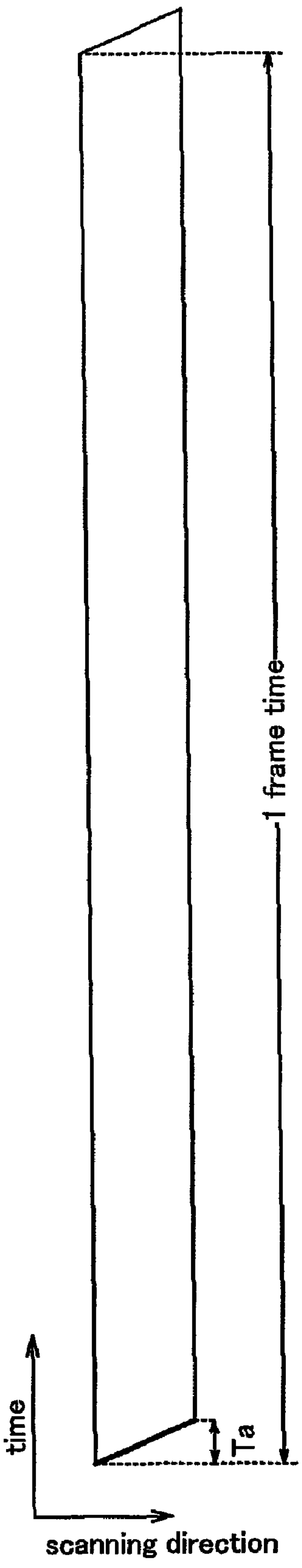

This embodiment will describe that the timing of a writing period appears, in which a video signal is input to a pixel portion in 1 frame time, with reference to FIGS. 13A and 13B.

FIG. 13A is a timing chart showing timing during which a video signal is input to a pixel portion when 1 frame time is divided into subframe times SF1 to SF6. The horizontal axis represents time and the vertical axis represents a scanning direction of a line selected by a scan line driver circuit. FIG. 13A shows an example in which a 6-bit video signal is used and 1 frame time is divided into six subframe times, which is the same number as the number of bits. Note that the number of bits of the video signal is not limited to six in the present invention.

Each of the subframe times SF1 to SF6 includes a writing period Ta for inputting a video signal to each pixel. In the writing period Ta, pixels of respective lines are sequentially selected by the scan line driver circuit. Then, a video signal is input to the pixels of the selected line from a signal line driver circuit. Then, display is performed in accordance with the video signal sequentially from the pixels of the line in which input of the video signal is terminated. When input of the video signals to the pixels of all the lines is terminated, the writing period is terminated. Note that since a video signal for one bit is input to the pixel portion in one writing period, termination of all the writing periods Ta corresponds to termination of input of the 6-bit video signal.

Then, when one writing period is terminated, display is continuously performed in accordance with video signal input to the pixel portion until writing period of the next subframe time appears. Next, a writing period corresponding to another subframe time appears, and the above-described operation is repeated. Then, when all the subframe time sequentially appear, 1 frame time is formed.

When all the subframe times in 1 frame time appear, an image having gray scale levels can be displayed. The number of gray scales can be determined by controlling luminance of a display element in each subframe time. For example, when 64 gray scale levels are displayed by a 6-bit video signal, the ratio of the length of the subframe times SF1 to SF6 is $2^5:2^4:2^3:2^2:2^1:2^0$ sequentially from the longest when the number of gray scale levels is changed linearly.

Note that although luminance of the display element included in the pixel is controlled in accordance with the video signal in the above-described operation, the present invention is not limited to this structure. For example, a non-display period during which luminance of the display element is forcibly made the lowest regardless of a video signal may be provided. Note that the non-display period is not necessarily provided. However, when the length of the subframe time is shorter than the length of the writing period, it is necessary to provide a non-display period as described above. When a non-display period is provided, there is no need for concurrently inputting video signals to pixels of two or more rows in the pixel portion.

Note that operations may be performed by further dividing one subframe time into a plurality of subframe times. In this case, each of the divided subframe times includes the writing period Ta.

Next, the case is described in which only one writing period Ta appears in 1 frame time. FIG. 13B is a timing chart showing timing during which video signals are input to a pixel portion. The horizontal axis represents time and the vertical axis represents a scanning direction of a line selected by a scan line driver circuit.

In FIG. 13B, pixels of respective lines are sequentially selected by the scan line driver circuit in the writing period Ta. Then, an analog video signal is input to the pixels of the selected line from a signal line driver circuit. Then, in the writing period Ta, display is performed in accordance with the video signal sequentially from the pixels of the line in which input of the video signal is terminated. When input of the video signals to the pixels of all the lines is terminated, the writing period is terminated. Next, display is performed in accordance with the video signal input to the pixel portion in the writing period Ta until the next frame time appears.

Note that the length of the writing period Ta in FIG. 13B can be set as appropriate by a designer as long as it is within 1 frame time. When the length of the writing period Ta is approximately the same as 1 frame time, driving frequency of the signal line driver circuit at the time of writing the video signal can be reduced and power consumption can also be reduced.

This embodiment mode can be implemented in combination with embodiment modes and embodiments above mentioned.

[Embodiment 6]

Next, a method of fabricating the display device of the invention will be described in detail. Although this embodiment illustrates a thin film transistor (TFT) as an exemplary semiconductor element, a semiconductor element used in the display device of the invention is not limited to this. For example, not only a TFT but also a memory element, a diode, a resistor, a capacitor, an inductor, or the like can be used.

Figures 14A, 14B, 14C:
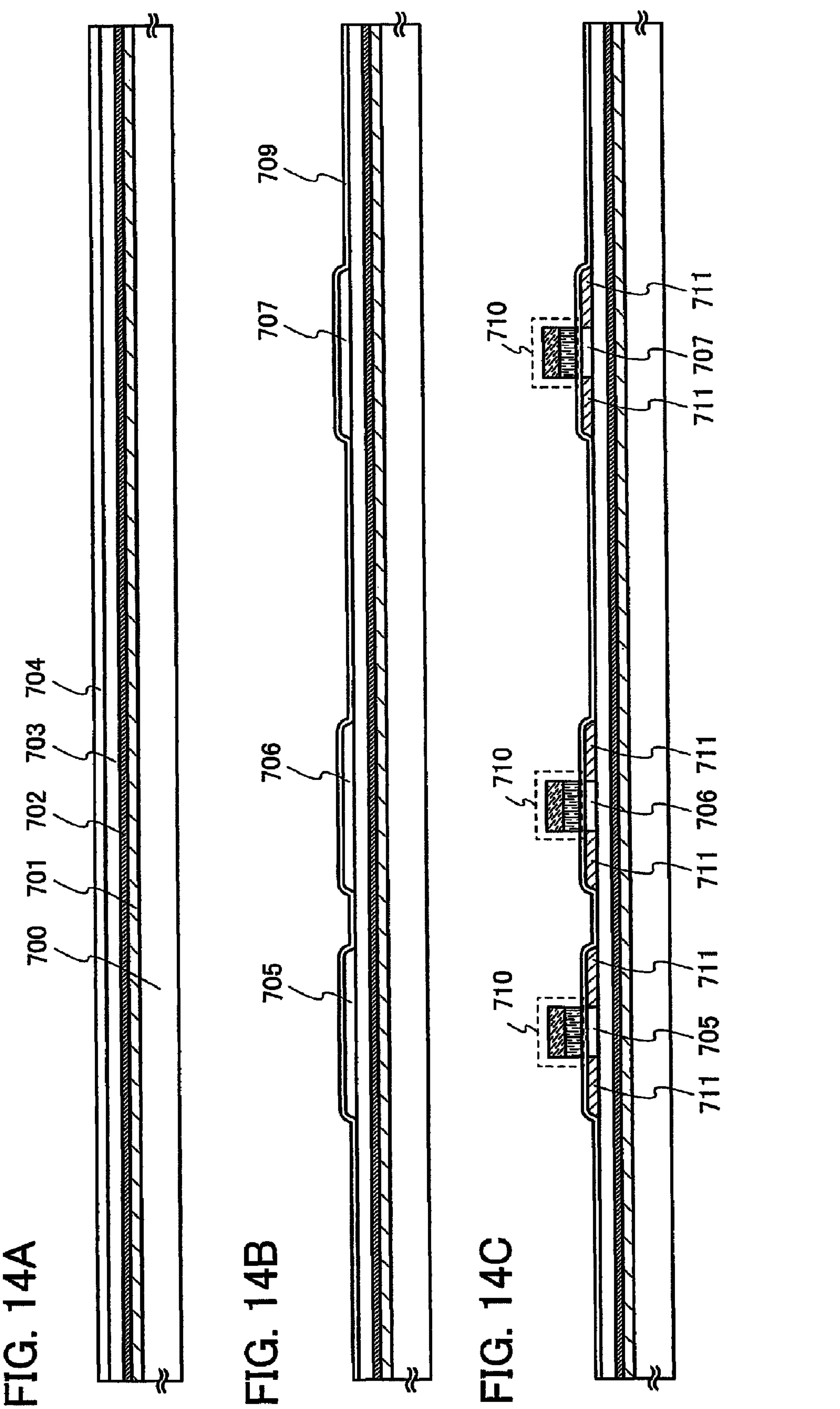
FIGS. 14A to 14C are diagrams showing a manufacturing method of a display device of the present invention.

First, as shown in FIG. 14A, an insulating film 701, a separation layer 702, an insulating film 703, and a semiconductor film 704 are sequentially formed over a heat-resistant substrate 700. The insulating film 701, the separation layer 702, the insulating film 703, and the semiconductor film 704 can be formed in succession.

For the substrate 700, it is possible to use, for example, a glass substrate made of barium borosilicate glass, aluminoborosilicate glass, or the like; a quartz substrate; a ceramic substrate; or the like. It is also possible to use a metal substrate such as a stainless steel substrate or a semiconductor substrate such as a silicon substrate. A substrate made of a flexible synthetic resin, e.g., plastic generally has a lower allowable temperature limit than the above-described substrates; however, such substrate can be used as long as it can withstand the processing temperature in the fabrication process.

Examples of a plastic substrate include polyester typified by polyethylene terephthalate (PET), polyethersulfone (PES), polyethylene naphthalate (PEN), polycarbonate (PC), polyetheretherketone (PEEK), polysulfone (PSF), polyetherimide (PEI), polyarylate (PAR), polybutylene terephthalate (PBT), polyimide, acrylonitrile-butadiene-styrene resin, polyvinyl chloride, polypropylene, polyvinyl acetate, acrylic resin, and the like.

Although the separation layer 702 is provided over the entire surface of the substrate 700 in this embodiment, the invention is not limited to this structure. For example, the separation layer 702 may be formed partially over the substrate 700 by a photolithography method or the like.

The insulating films 701 and 703 are formed by depositing an insulating material such as silicon oxide, silicon nitride (e.g., $SiN_x$ or $Si_3N_4$), silicon oxynitride ($SiO_xN_y$ where x>y>0), or silicon nitride oxide ($SiN_xO_y$ where x>y>0) by a CVD method, a sputtering method, or the like.

The insulating films 701 and 703 are provided to prevent an alkali metal such as Na or an alkaline earth metal contained in the substrate 700 from being diffused into the semiconductor film 704, which would otherwise adversely affect the characteristics of semiconductor elements such as TFTs. In addition, the insulating film 703 functions to prevent an impurity element contained in the separation layer 702 from being diffused into the semiconductor film 704, and also functions to protect the semiconductor elements in the later step of separating the semiconductor elements.

Each of the insulating films 701 and 703 can be either a single insulating film or stacked layers of a plurality of insulating films. In this embodiment, the insulating film 703 is formed by sequentially depositing a silicon oxynitride film to a thickness of 100 nm, a silicon nitride oxide film to a thickness of 50 nm, and a silicon oxynitride film to a thickness of 100 nm. However, the material and thickness of each film as well as the number of stacked layers are not limited to this example. For example, the bottom silicon oxynitride film may be replaced with a siloxane resin having a thickness of 0.5 to 3 μm that is formed by a spin coating method, a slit coating method, a droplet discharge method, a printing method, or the like. In addition, the middle silicon nitride oxide film may be replaced with a silicon nitride (e.g., $SiN_x$ or $Si_3N_4$) film. Further, the top silicon oxynitride film may be replaced with a silicon oxide film. The thickness of each film is preferably 0.05 to 3 μm, and can be freely selected within this range.

Alternatively, it is also possible to form the bottom layer of the insulating film 703, which is closest to the separation layer 702, using a silicon oxynitride film or a silicon oxide film, form the middle layer using a siloxane resin, and form the top layer using a silicon oxide film.

Note that a siloxane resin is a resin formed from a siloxane material as a starting material and having the bond of Si—O—Si. A siloxane resin may contain at least one of fluorine, an alkyl group, and aromatic hydrocarbon, in addition to hydrogen as a substituent.

The silicon oxide film can be formed by thermal CVD, plasma CVD, atmospheric pressure CVD, bias ECRCVD, or the like, using a mixed gas of combination such as silane and oxygen, TEOS (tetraethoxysilane) and oxygen, or the like. The silicon nitride film can be typically formed by plasma CVD using a mixed gas of silane and ammonia. The silicon oxynitride film and the silicon nitride oxide film can be typically formed by plasma CVD using a mixed gas of silane and nitrous oxide.

For the separation layer 702, it is possible to use a metal film, a metal oxide film, or a stacked film of a metal film and a metal oxide film. The metal film and the metal oxide film can be either a single layer or a stacked structure of a plurality of layers. In addition to a metal film or a metal oxide film, metal nitride or metal oxynitride can also be used. The separation layer 702 can be formed by a sputtering method or various CVD methods such as a plasma CVD method.

Examples of metals used for the separation layer 702 include tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium, and the like. In addition to such metal films, the separation layer 702 can also be formed using a film made of an alloy containing the above-described metal as a main component or a compound containing the above-described metal.

Alternatively, the separation layer 702 can also be formed using a single silicon (Si) film or a film made of a compound containing silicon (Si) as a main component. As a further alternative, the separation layer 702 can also be formed using a film made of an alloy of silicon (Si) and the above-described metal. A film containing silicon can have any of amorphous, microcrystalline, and polycrystalline structures.

The separation layer 702 can be either a single layer of the above-described film or stacked layers thereof. The separation layer 702 having a stack of a metal film and a metal oxide film can be formed by sequentially forming a base metal film and oxidizing or nitriding the surface of the metal film. Specifically, plasma treatment may be applied to the base metal film in an oxygen atmosphere or a nitrous oxide atmosphere, or thermal treatment may be applied to the metal film in an oxygen atmosphere or a nitrous oxide atmosphere. Alternatively, oxidation of the metal film can be accomplished by forming a silicon oxide film or a silicon oxynitride film on the base metal film so as to be in contact with the base film. Similarly, nitridation can be accomplished by forming a silicon oxynitride film or a silicon nitride film on the base metal film so as to be in contact with the base film.

As the plasma treatment for oxidation or nitridation of the metal film, it is possible to perform high-density plasma treatment with a plasma density of $1\times10^{11}$ $cm^{-3}$ or higher, preferably in the range of $1\times10^{11}$ to $9\times10^{15}$ $cm^{-3}$ and with high frequency such as microwaves (e.g., a frequency of 2.45 GHz).

Although the separation layer 702 having a stack of a metal film and a metal oxide film can be formed by oxidizing the surface of the base metal film, it is also possible to sequentially form a metal film and form a metal oxide film thereon. For example, in the case of using tungsten as a metal, a tungsten film is formed as a base metal film by a sputtering method, a CVD method, or the like, and then plasma treatment is applied to the tungsten film. Accordingly, a tungsten film that is a metal film and a metal oxide film that is in contact with the metal film and is formed from oxide of tungsten can be formed.

Note that oxide of tungsten is represented by $WO_X$. X is in the range of 2 to 3, inclusive. There are cases where X is 2 ($WO_2$), X is 2.5 ($W_2O_5$), X is 2.75 ($W_4O_{11}$), and X is 3 ($WO_3$). In formation of oxide of tungsten, there is no limitation on the value of X, and the value of X may be determined based on the etching rate or the like.

It is preferable that the semiconductor film 704 is consecutively formed after the formation of the insulating film 703 without exposure to air. The thickness of the semiconductor film 704 is 20 to 200 nm (preferably 40 to 170 nm, or more preferably 50 to 150 nm). Note that the semiconductor film 704 may be either an amorphous semiconductor or a polycrystalline semiconductor. Further, not only silicon but also silicon germanium can be used for the semiconductor. In the case of using silicon germanium, the concentration of germanium is preferably about 0.01 to 4.5 atomic %.

Note that the semiconductor film 704 can be crystallized by a known technique. As a known crystallization method, there are a laser crystallization method with laser light and a crystallization method with a catalytic element. Alternatively, it is also possible to combine a crystallization method with a catalytic element and a laser crystallization method. In the case of using a thermally stable substrate such as quartz for the substrate 700, it is possible to combine any of the following crystallization methods: a thermal crystallization method With an electrically heated oven, a lamp anneal crystallization method with infrared light, a crystallization method with a catalytic element, and high temperature annealing at about 950° C.

For example, in the case of using laser crystallization, thermal treatment at 550° C. is applied to the semiconductor film 704 for four hours before the laser crystallization, in order to enhance the resistance of the semiconductor film 704 to laser. When a continuous-wave solid-state laser is used and irradiation is conducted with the second to fourth harmonics of the fundamental wave, crystals with a large grain size can be obtained. Typically, the second harmonic (532 nm) or the third harmonic (355 nm) of an Nd: $YVO_4$ laser (the fundamental wave of 1064 nm) is preferably used. Specifically, laser light emitted from a continuous-wave $YVO_4$ is converted into a harmonic with a nonlinear optical element, so that laser light having an output of 10 W is obtained. Then, the laser light is preferably shaped into a rectangular shape or an elliptical shape with optics on the irradiation surface. In this case, a laser power density of about 0.01 to 100 $MW/cm^2$ (preferably, 0.1 to 10 $MW/cm^2$) is required, and irradiation is conducted with a scanning rate of about 10 to 2000 cm/sec.

As a continuous-wave gas laser, an Ar laser, a Kr laser, or the like can be used. As a continuous-wave solid-state laser, the following can be used: a YAG laser, a $YVO_4$ laser, a YLF laser, a $YAlO_3$ laser, a forsterite ($Mg_2SiO_4$) laser, a $GdVO_4$ laser, a $Y_2O_3$ laser, a glass laser, a ruby laser, an alexandrite laser, a Ti:sapphire laser, and the like.

Alternatively, the following pulsed lasers can be used: an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti:sapphire laser, a copper vapor laser, and a gold vapor laser.

The repetition rate of pulsed laser light may be set at 10 MHz or higher, so that laser crystallization may be performed with a considerably higher frequency band than the normally used frequency band in the range of several ten to several hundred Hz. It is said that it takes several ten to several hundred nsec for the semiconductor film 704 to become completely solidified after being irradiated with pulsed laser light. Therefore, by using laser light with the above-described repetition rate, the semiconductor film 704 can be irradiated with the next laser pulse after it is melted by the previous laser light but before it becomes solidified. Accordingly, the solid-liquid interface of the semiconductor film 704 can be moved continuously and, thus, the semiconductor film 704 having crystal grains that have grown continuously in the scanning direction can be formed. Specifically, it is possible to form an aggregation of crystal grains having a width of about 10 to 30 μm in the scanning direction and a width of about 1 to 5 μm in the a direction perpendicular to the scanning direction. By forming single crystals with crystal grains that have continuously grown in the scanning direction, it is possible to form the semiconductor film 704 having few crystal grains at least in the channel direction of a TFT.

Note that laser crystallization can be performed by irradiation with a fundamental wave of continuous-wave laser light and a harmonic of continuous-wave laser light in parallel. Alternatively, laser crystallization can also be performed by irradiation with a fundamental wave of continuous-wave laser light and a harmonic of pulsed laser light in parallel.

Note that laser irradiation can be performed in an inert gas atmosphere such as a rare gas or a nitrogen gas. Accordingly, roughness of the semiconductor surface by laser irradiation can be suppressed, and variations in threshold resulting from variations in interface state density can be suppressed.

By the above-described laser irradiation, the semiconductor film 704 with enhanced crystallinity can be formed. Note that it is also possible to use a polycrystalline semiconductor, which is formed by a sputtering method, a plasma CVD method, a thermal CVD method, or the like, for the semiconductor film 704.

Although the semiconductor film 704 is crystallized in this embodiment, it is not necessarily required to be crystallized and can remain as an amorphous silicon film or a microcrystalline semiconductor film to proceed to the following process. A TFT formed using an amorphous semiconductor or a microcrystalline semiconductor involves less fabrication steps than TFTs formed using a polycrystalline semiconductor. Therefore, it has an advantage of low cot and high yield.

The amorphous semiconductor can be obtained by glow discharge decomposition of a gas containing silicon. As the gas containing silicon, $SiH_4$ and $Si_2H_6$ are given. Those gases containing silicon may be used by diluting with hydrogen, or hydrogen and helium.

Next, channel doping is performed, by which an impurity element imparting p-type conductivity or an impurity element imparting n-type conductivity is added at a low concentration to the semiconductor film 704. Channel doping may be performed to entire of the semiconductor film 704 or part of the semiconductor film 704 as selected. As the impurity element imparting p-type conductivity, boron (B), aluminum (Al), gallium (Ga), or the like can be used. As the impurity element imparting n-type conductivity, phosphorus (P), arsenic (As), or the like can be used. Here, boron (B) is used as the impurity element and added at a concentration of $1\times10^{16}$ to $5\times10^{17}/cm^3$.

Next, as shown in FIG. 14B, the semiconductor film 704 is patterned into predetermined shapes, so that island-shaped semiconductor films 705 to 707 are formed. Then, a gate insulating film 709 is formed so as to cover the island-shaped semiconductor films 705 to 707. The gate insulating film 709 can be formed by depositing a film containing silicon nitride, silicon oxide, silicon nitride oxide, or silicon oxynitride, either in a single layer or stacked layers by a plasma CVD method, a sputtering method, or the like. When the gate insulating film 709 is formed to have stacked layers, it is preferable to form a three-layer structure in which a silicon oxide film, a silicon nitride film, and a silicon oxide film are sequentially stacked over the substrate 700.

The gate insulating film 709 can also be formed by oxidizing or nitriding the surfaces of the island-shaped semiconductor films 705 to 707 by high-density plasma treatment. High-density plasma treatment is performed by using, for example, a mixed gas of a rare gas such as He, Ar, Kr, or Xe; and oxygen, nitrogen oxide, ammonia, nitrogen, or hydrogen. When plasma is excited by introduction of microwaves, plasma with a low electron temperature and high density can be generated. When the surfaces of the semiconductor films are oxidized or nitrided by oxygen radicals (there may also be OH radicals) or nitrogen radicals (there may also be NH radicals) generated by such high-density plasma, an insulating film with a thickness of 1 to 20 nm, typically 5 to 10 nm is formed to be in contact with the semiconductor films. Such an insulating film having a thickness of 5 to 10 nm is used as the gate insulating film 709.

Oxidation or nitridation of the semiconductor films by the above-described high-density plasma treatment proceeds by solid-phase reaction. Therefore, interface state density between the gate insulating film and the semiconductor films can be suppressed quite low. Further, by directly oxidizing or nitriding the semiconductor films by high-density plasma treatment, variations in thickness of the insulating film to be formed can be suppressed. Furthermore, in the case where the semiconductor films have crystallinity and the surfaces of the semiconductor films are oxidized by solid-phase reaction by high-density plasma treatment, crystal grain boundaries can be prevented from being locally oxidized at a fast speed. Thus, an uniform gate insulating film with low interface state density can be formed. A transistor whose gate insulating film partially or wholly includes an insulating film formed by high-density plasma treatment can suppress variations in characteristics.

Next, as shown in FIG. 14C, a conductive film is formed over the gate insulating film 709, and the conductive film is patterned into predetermined shapes, so that electrodes 710 are formed above the island-shaped semiconductor films 705 to 707. In this embodiment, the electrodes 710 are each formed by patterning two stacked conductive films. For the conductive films, tantalum (Ta), tungsten (W), titanium (Ti), molybdenum (Mo), aluminum (Al), copper (Cu), chromium (Cr), niobium (Nb), and the like can be used. Alternatively, an alloy containing the above-described metal as a main component or a compound containing the above-described metal can also be used. Further, it is also possible to use a semiconductor, e.g., polycrystalline silicon doped with an impurity element such as phosphorus which imparts conductivity to the semiconductor film.

In this embodiment, a tantalum nitride film or a tantalum (Ta) film is used as a first conductive film, and a tungsten (W) film is used as a second conductive film. Besides the example shown in this embodiment, the following combinations of two conductive films can be given as alternative examples: a tungsten nitride film and a tungsten film, a molybdenum nitride film and a molybdenum film, an aluminum film and a tantalum film, an aluminum film and a titanium film, and the like. Tungsten and tantalum nitride have high heat resistance. Therefore, after the formation of the two conductive films, they may be heated for the purpose of thermal activation. Further, as other exemplary combinations of the second conductive film, it is also possible to use silicon doped with an n-type impurity and NiSi (nickel silicide), Si doped with an n-type impurity and WSix, and the like.

Although this embodiment illustrates the electrodes 710 having two stacked conductive films, this embodiment is not limited to this structure. The electrodes 710 may also be formed from a single conductive film, or three or more stacked conductive films. In the case of using a three-layer structure in which three or more conductive films are stacked, it is preferable to form a stacked structure of a molybdenum film, an aluminum film, and a molybdenum film.

The conductive films can be formed by a CVD method, a sputtering method, or the like. In this embodiment, a first conductive film is formed to a thickness of 20 to 100 nm and a second conductive film is formed to a thickness of 100 to 400 nm.

Note that a resist mask used for the formation of the electrodes 710 may be replaced with a mask made of silicon oxide, silicon oxynitride, or the like. In that case, it is necessary to perform an additional patterning step for formation of a mask of silicon oxide, silicon oxynitride, or the like. However, since reduction in thickness of the mask in etching is less than the case of using a resist, the electrodes 710 with a desired width can be formed. Alternatively, the electrodes 710 can be selectively formed by a droplet discharge method without using a mask.

Note that a droplet discharge method means a method of forming a predetermined pattern by discharging or ejecting a droplet containing a predetermined composition from an orifice. An inkjet method is given as one example.

Next, the island-shaped semiconductor films 705 to 707 are doped with an impurity element which imparts n-type conductivity (typically, P (Phosphorus) or As (Arsenic)) with the electrodes 710 as masks, so that the island-shaped semiconductor films 705 to 707 contain the impurity element at a low concentration (a first doping step). The conditions of the first doping step are as follows: a dosage of $1\times10^{15}$ to $1\times10^{19}/cm^3$ and an acceleration voltage of 50 to 70 keV. However, the invention is not limited to such conditions. By this first doping step, doping is performed through the gate insulating film 709, so that low concentration impurity regions 711 are formed in each of the island-shaped semiconductor films 705 to 707. Note that the first doping step may be performed with the island-shaped semiconductor film 706, which is to be a p-channel TFT, covered with a mask.

Figure 15A:
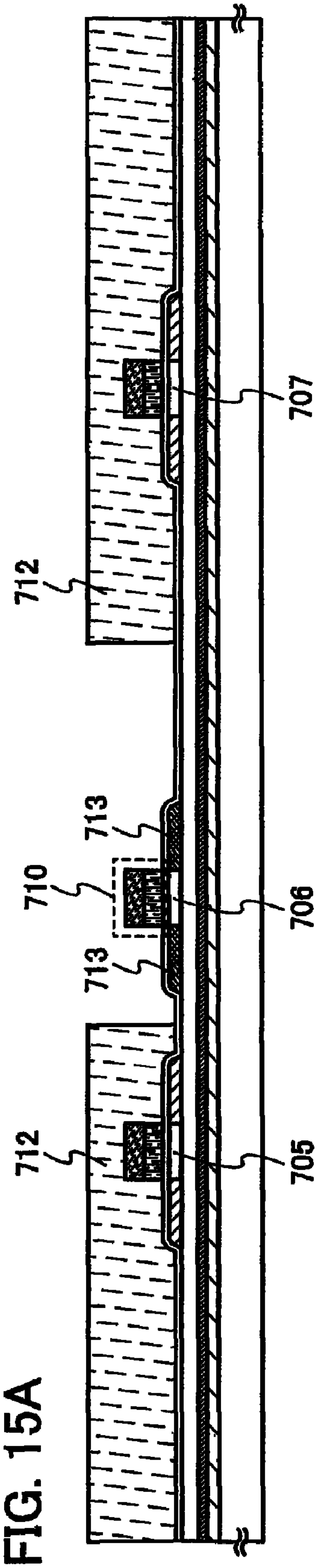
FIGS. 15A to 15C are diagrams showing a manufacturing method of a display device of the present invention.

Next, as shown in FIG. 15A, a mask 712 is formed so as to cover the island-shaped semiconductor films 705 and 707 that are to be n-channel TFTs. Then, the island-shaped semiconductor film 706 is doped with an impurity element which imparts p-type conductivity (typically, B (boron)) with the mask 712 and the electrodes 710 as masks, so that the island-shaped semiconductor film 706 contains the impurity element at a high concentration (a second doping step). The conditions of the second doping step are as follows: a dosage of $1\times10^{19}$ to $1\times10^{20}/cm^3$ and an acceleration voltage of 20 to 40 keV. By this second doping step, doping is performed through the gate insulating film 709, so that high concentration impurity regions 713 are formed in the island-shaped semiconductor film 706.

Figure 15B:
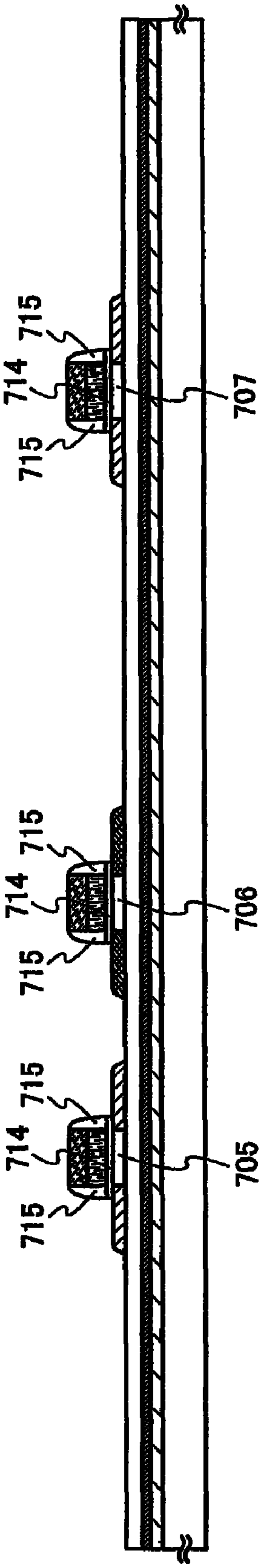

Next, as shown in FIG. 15B, the mask 712 is removed by ashing or the like, and an insulating film is formed so as to cover the gate insulating film 709 and the electrodes 710. The insulating film is formed by depositing a silicon film, a silicon oxide film, a silicon oxynitride film, a silicon nitride oxide film, or a film containing an organic material such as an organic resin, either in a single layer or stacked layers by a plasma CVD method, a sputtering method, or the like. In this embodiment, a silicon oxide film is formed to a thickness of 100 nm by a plasma CVD method.

Next, the gate insulating film 709 and the insulating film are partially etched by anisotropic etching (mainly in the perpendicular direction). By this anisotropic etching, the gate insulating film 709 is partially etched to leave gate insulating films 714 that are partially formed over the island-shaped semiconductor films 705 to 707. In addition, the insulating film which is formed to cover the gate insulating film 709 and the electrodes 710 is also etched partially by the anisotropic etching, so that sidewalls 715 having a contact with the side faces of the electrodes 710 are formed. The sidewalls 715 are used as doping masks for formation of LDD (Lightly Doped Drain) regions. In this embodiment, a mixed gas of $CHF_3$ and He is used as an etching gas. Note that the step of forming the sidewalls 715 is not limited to this example.

Figure 15C:
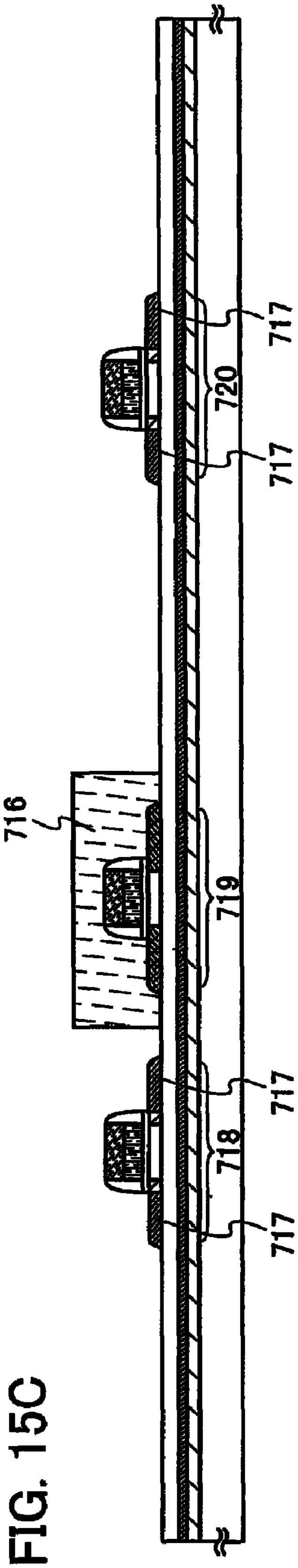

Next, a mask 716 is formed so as to cover the island-shaped semiconductor film 706 that is to be a p-channel TFT, as shown in FIG. 15C. Then, the island-shaped semiconductor films 705 and 707 are doped with an impurity element which imparts n-type conductivity (typically, P or As) by using the mask 716, the electrodes 710, and the sidewalls 715 as masks, so that the island-shaped semiconductor films 705 and 707 contain the impurity element at a high concentration (a third doping step). The conditions of the third doping step are as follows: a dosage of $1\times10^{19}$ to $1\times10^{20}/cm^3$ and an acceleration voltage of 60 to 100 keV. By this third doping step, n-type high concentration impurity regions 717 are formed in each of the island-shaped semiconductor films 705 and 707.

Note that the sidewalls 715 function as masks later at the time of forming low concentration impurity regions or non-doped offset regions below the sidewalls 715 by doping the semiconductor film with an impurity which imparts n-type conductivity so that the semiconductor film contains the impurity element at a high concentration. Therefore, in order to control the width of the low concentration impurity regions or the non-doped offset regions, the size of the sidewalls 715 may be controlled by appropriately changing the anisotropic etching conditions for the formation of the sidewalls 715 or the thickness of the insulating film for forming sidewalls 715. Note that in the semiconductor film 706, low concentration impurity regions or non-doped offset regions may be formed below the sidewalls 715.

Next, the mask 716 is removed by ashing or the like, and then the impurity regions may be activated by thermal treatment. For example, a silicon oxynitride film with a thickness of 50 nm may be formed first, followed by thermal treatment at 550° C. in a nitrogen atmosphere for four hours.

Alternatively, a silicon nitride film containing hydrogen may be formed first to a thickness of 100 nm, followed by thermal treatment at 410° C. in a nitrogen atmosphere for one hour so that the island-shaped semiconductor films 705 to 707 are hydrogenated. As a further alternative, the island-shaped semiconductor films 705 to 707 may be subjected to thermal treatment at 300 to 450° C. in an atmosphere containing hydrogen for 1 to 12 hours so as to be hydrogenated. The thermal treatment can be performed by a thermal annealing, a laser annealing method, an RTA method, or the like. By the thermal treatment, not only hydrogenation but also activation of the impurity element that has been added into the semiconductor films can be accomplished. As an alternative method of hydrogenation, it is also possible to perform plasma hydrogenation (which uses hydrogen excited by plasma). By such hydrogenation step, dangling bonds can be terminated with thermally excited hydrogen.

By the series of the above-described steps, n-channel TFTs 718 and 720 and a p-channel TFT 719 are formed.

Figure 16A:
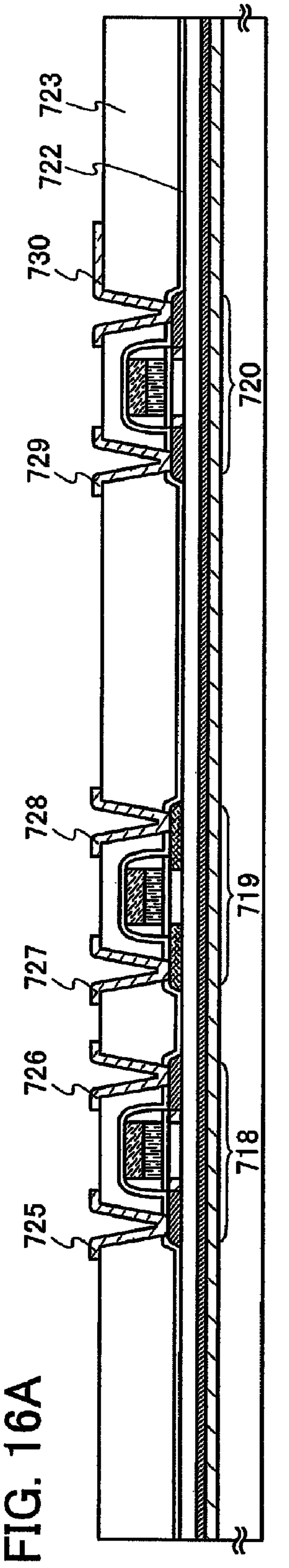
FIGS. 16A to 16C are diagrams showing a manufacturing method of a display device of the present invention.

Next, as shown in FIG. 16A, an insulating film 722 for protection of the TFTs 718 to 720 is formed. Although the insulating film 722 is not necessarily required, the provision of the insulating film 722 can prevent intrusion of an impurity such as an alkali metal or an alkaline earth metal into the TFTs 718 to 720. Specifically, it is preferable to use silicon nitride, silicon nitride oxide, aluminum nitride, aluminum oxide, silicon oxide, or the like for the insulating film 722. In this embodiment, a silicon oxynitride film with a thickness of about 600 nm is used for the insulating film 722. In this case, the above-described hydrogenation step may be performed after the formation of this silicon oxynitride film.

Next, an insulating film 723 is formed over the insulating film 722 so as to cover the TFTs 718 to 720. For the insulating film 723, thermally stable organic materials such as polyimide, acrylic, benzocyclobutene, polyamide, or epoxy can be used. In addition to such organic materials, it is also possible to use a low-dielectric constant material (a low-k material), a siloxane resin, silicon oxide, silicon nitride, silicon oxynitride, silicon nitride oxide, PSG (phosphosilicate glass), BPSG (borophosphosilicate glass), alumina, and the like. A siloxane resin may contain as a substituent at least one of fluorine, an alkyl group, and aromatic hydrocarbon, in addition to hydrogen. Note that the insulating film 723 can also be formed by stacking a plurality of insulating films made of such materials.

A method for forming the insulating film 723 can be selected as appropriate according to a material used, e.g., a CVD method, a sputtering method, a SOG method, spin coating, dipping, spray coating, a droplet discharge method (e.g., an inkjet method, screen printing, offset printing, or the like), a doctor knife, a roll coater, a curtain coater, a knife coater, or the like.

Next, contact holes are formed in the insulating films 722 and 723 so as to partially expose the island-shaped semiconductor films 705 to 707. Then, conductive films 725 to 730 are formed which is in contact with the island-shaped semiconductor films 705 to 707 through the contact holes. Although a mixed gas of $CHF_3$ and He is used as an etching gas for formation of the contact holes, the invention is not limited to this.

The conductive films 725 to 730 can be formed by a CVD method, a sputtering method, or the like. Specifically, the conductive films 725 to 730 can be formed using aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), silicon (Si), or the like. Alternatively, an alloy containing the above-described metal as a main component or a compound containing the above-described metal can also be used. The conductive films 725 to 730 can be either a single layer of the above-described metal film or a plurality of stacked layers thereof.

As an example of an alloy containing aluminum as a main component, an alloy which contains aluminum as a main component and contains nickel can be given. Further, an alloy which contains aluminum as a main component and contains nickel and one or both of carbon and silicon can also be given. Aluminum and aluminum silicon, which have a low resistance value and are inexpensive, are the most suitable materials for formation of the conductive films 725 to 730. In particular, when an aluminum silicon (Al—Si) film is used, generation of hillocks in resist baking can be suppressed more than the case of using an aluminum film, in patterning the conductive films 725 to 730. Further, instead of silicon (Si), about 0.5% Cu may be mixed into the aluminum film.

Each of the conductive films 725 to 730 is preferably formed to have a stacked structure of, for example, a barrier film, an aluminum silicon (Al—Si) film, and a barrier film, or a stacked structure of a barrier film, an aluminum silicon (Al—Si) film, a titanium nitride film, and a barrier film. Note that a barrier film is a film formed from titanium, titanium nitride, molybdenum, molybdenum nitride, or the like. When barrier films are formed to sandwich an aluminum silicon (Al—Si) film therebetween, generation of hillocks of aluminum or aluminum silicon can be prevented more effectively. In addition, when a barrier film made of titanium which is a high reducible element is formed, even when there are thin oxide films on the island-shaped semiconductor films 705 to 707, the oxide films can be reduced by titanium contained in the barrier film, whereby a favorable contact between the conductive films 725 to 730 and the island-shaped semiconductor films 705 to 707 can be obtained. Further, it is also possible to stack a plurality of barrier films. In that case, the conductive films 725 to 730 can each have a five-layer structure in which titanium, titanium nitride, aluminum silicon, titanium, and titanium nitride are sequentially stacked from the bottom.

Note that the conductive films 725 and 726 are connected to the high concentration impurity regions 717 of the n-channel TFT 718. The conductive films 727 and 728 are connected to the high concentration impurity regions 713 of the p-channel TFT 719. The conductive films 729 and 730 are connected to the high concentration impurity regions 717 of the n-channel TFT 720.

Figure 16B:
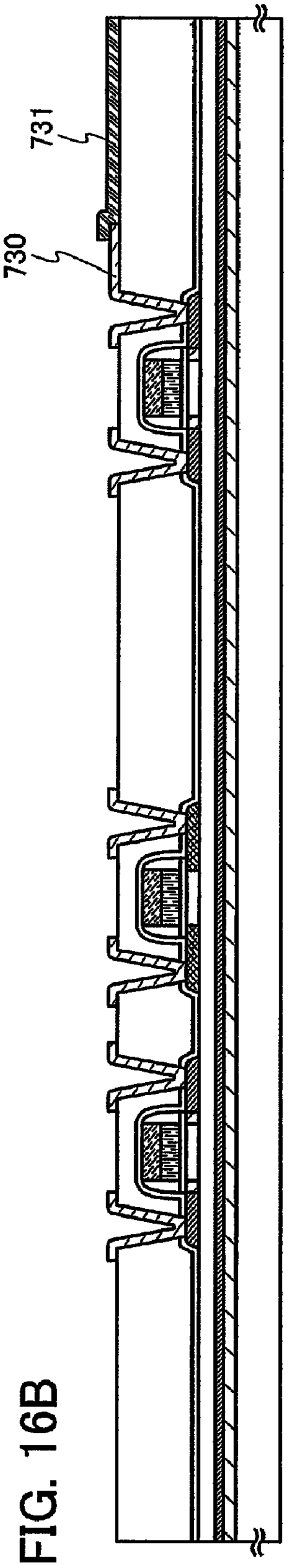

Next as shown in FIG. 16B, an electrode 731 is formed over the insulating film 723 so as to be in contact with the conductive film 730. FIG. 16 shows an example of manufacturing a reflective liquid crystal element by forming the electrode 731 using a conductive film which easily refracts light; however, the present invention is not limited to the structure. The pixel electrode is formed with a transparent conductive film so that a transmissive liquid crystal element is form. Note that in the case of a reflective liquid crystal element, a part of the conductive film 730 can be used as an electrode without providing the electrode 731 intentionally. In addition, a display element using display material having a memory characteristic, and a light-emitting element typified an organic light-emitting element (OLED) can be used without being limited to the liquid crystal element.

A transparent conductive film used as the electrode 731 can be formed of indium tin oxide containing silicon oxide (ITSO), indium tin oxide (ITO), zinc oxide (ZnO), indium zinc oxide (IZO), gallium-doped zinc oxide (GZO), or the like.

Figure 16C:
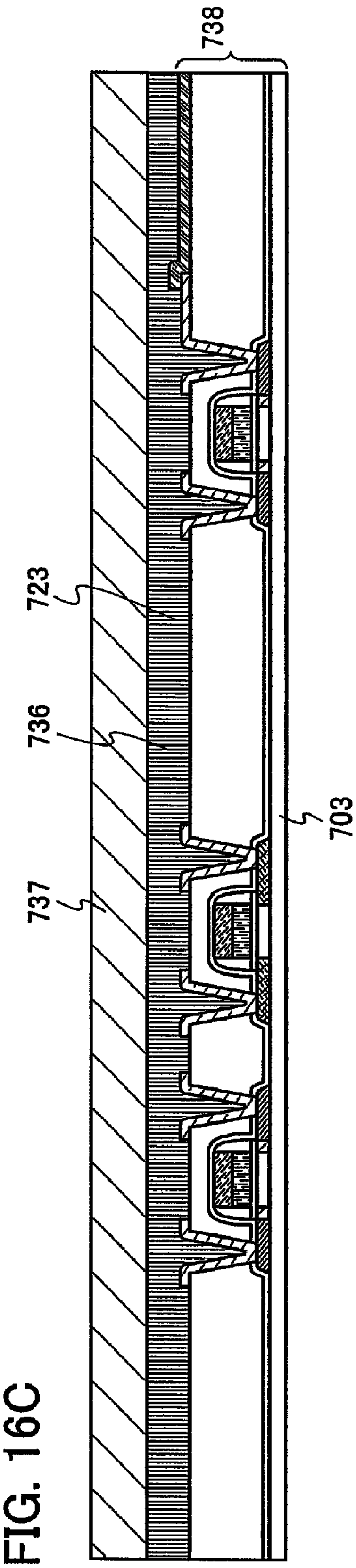

Next as shown in FIG. 16C, a protective layer 736 is formed over the insulating film 723 so as to cover the conductive films 725 to 730 and the electrode 731. A material which can protect the insulating film 723, the conductive films 725 to 730 and the electrode 731 when the substrate 700 is separated later at the separation layer 702 as a boundary is used for the protective layer 736. For example, the protective layer 736 can be formed in such a way in that an epoxy resin, an acrylate resin, or a silicone resin, which is soluble in water or alcohols is applied to the entire surface.

In this embodiment, the protective layer 736 is formed by the steps of applying a water-soluble resin (VL-WSHL10, product of Toagosei Co., Ltd.) to a thickness of 30 μm by a spin coating method, pre-curing the resin by light exposure for two minutes, and completely curing the resin by light exposure again with ultraviolet rays for 12.5 minutes in total (2.5 minutes from the rear surface and 10 minutes from the front surface). In the case of stacking a plurality of organic resins, there is a possibility that part of the organic resins might be melted or adhesion thereof might become extremely high during a coating step or a baking step depending on a solvent used, and so on. Therefore, in the case of using organic resins that are soluble in the same solvent for the insulating film 723 and the protective layer 736, it is preferable to form an inorganic insulating film (e.g., a silicon nitride film, a silicon nitride oxide film, an $AlN_x$ film, or an $AlN_xO_y$ film) so as to cover the insulating film 723 in order that the protective layer 736 can be smoothly removed in a subsequent step.

Next, as shown in FIG. 16C, layers of from the insulating film 703 up to conductive films 725 to 730 and the electrode 731 formed over the insulating film 723, which include semiconductor elements typified by TFTs and various conductive films, (hereinafter collectively referred to as an "element formation layer 738") are separated from the substrate 700. In this embodiment, a first sheet material 737 is attached to the protective layer 736, and the element formation layer 738 and the protective layer 736 are separated from the substrate 700 by using a physical force. The separation layer 702 may partially remain without being entirely removed.

The above-described separation step may be performed by a method of etching the separation layer 702. In this case, a trench is formed so as to partially expose the separation layer 702. The trench is formed by dicing, scribing, and a process using laser including UV light, a photolithography method, or the like. The trench may be deep enough to expose the separation layer 702. Further, halogen fluoride is used as an etching gas, and the gas is introduced through the trench. In this embodiment, etching is performed under the conditions of, for example, using $ClF_3$ (chlorine trifluoride), a temperature of 350° C/, a flow rate of 300 sccm, an atmospheric pressure of 800 Pa, and a period of three hours. In addition, nitrogen may be mixed into the $ClF_3$ gas. Using halogen fluoride such as $ClF_3$ enables the separation layer 702 to be selectively etched, so that the substrate 700 can be separated from the element formation layer 738. Note that halogen fluoride may be either gas or liquid.

Figure 17A:
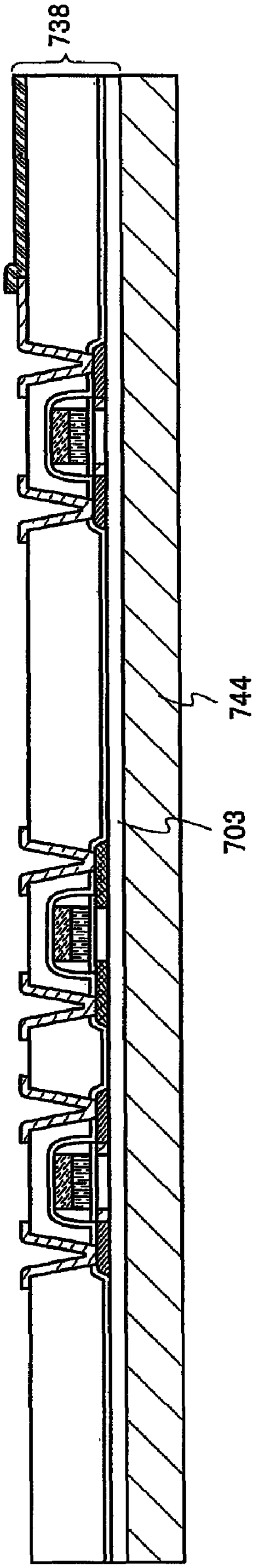
FIGS. 17A and 17B are diagrams showing a manufacturing method of a display device of the present invention.

Next as shown in FIG. 17A, a second sheet material 744 is attached to the exposed surface of the element formation layer 738 by the separation. Then, after the element formation layer 738 and the protective layer 736 are separated from the first sheet material 737, the protective layer 736 is removed.

For the second sheet material 744, it is possible to use, for example, a glass substrate made of barium borosilicate glass, aluminoborosilicate glass, an organic material such as a piece of paper, or plastic which are flexible. Alternatively, as the material of the second sheet material 744, an inorganic material which is flexible can be used. ARTON (manufactured by JSR) formed of poly norbornene having a polar group can be used as a plastic substrate. In addition, polyester typified by polyethylene terephthalate (PET), polyethersulfone (PES), polyethylene naphthalate (PEN), polycarbonate (PC), polyetheretherketone (PEEK), polysulfone (PSF), polyetherimide (PEI), polyarylate (PAR), polybutylene terephthalate (PBT), polyimide, acrylonitrile-butadiene-styrene resin, polyvinyl chloride, polypropylene, polyvinyl acetate, acrylic resin, and the like can be used.

Note that in the case where semiconductor elements corresponding to a plurality of display devices are formed over the substrate 700, the element formation layer 738 is cut into individual display devices. Cutting can be performed with a laser irradiation apparatus, a dicing apparatus, a scribing apparatus, or the like.

Figure 17B:
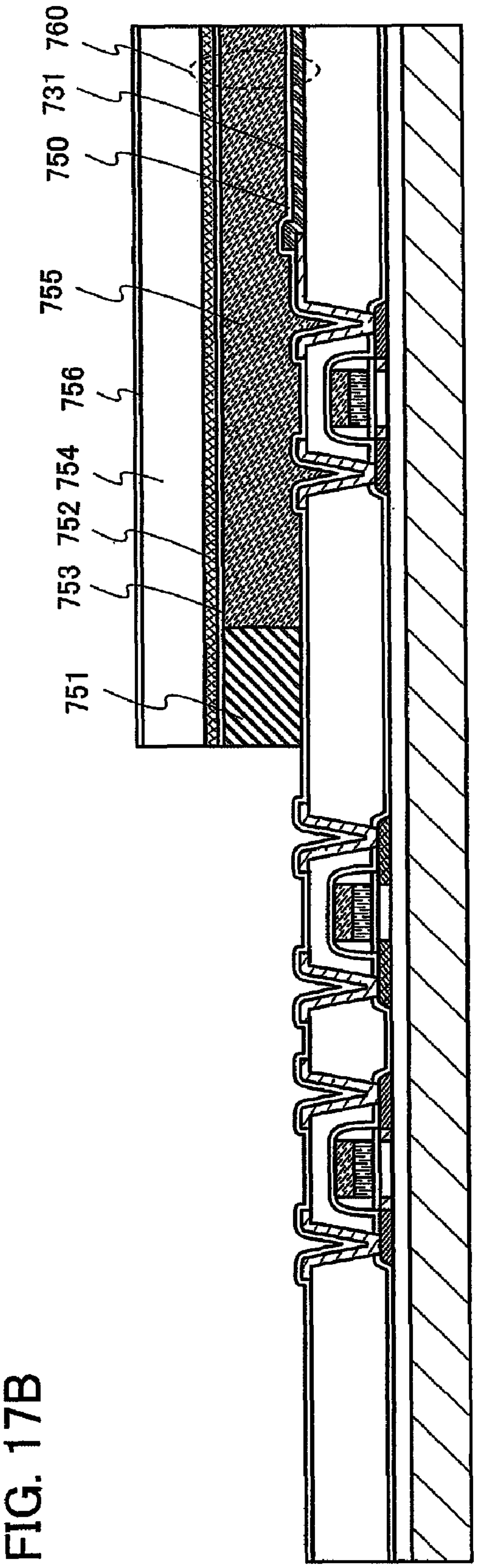

As shown in FIG. 17B, an orientation film 750 is formed so as to cover the conductive film 730 and the electrode 731, and rubbing treatment is performed. Then, a sealing material 751 for sealing the liquid crystal is formed. On the other hand, a substrate 754 on which an electrode 752 using a transparent conductive film and an orientation film 753 to which rubbing treatment is performed is prepared. Then, liquid crystal 755 is dropped in the region surrounded by the sealing material 751, and the substrate 754 which is prepared separately is attached using the sealing material 751 so that the electrode 752 and the electrode 731 are faced. Note that filler may be mixed in the sealing material 751.

Note that a color filter and a shielding film (black matrix) for preventing disclination may be formed. In addition, a polarizing plate 756 is attached to the opposite face of the substrate 754 on which the electrode 752 is formed.

A transparent conductive film used for as the electrode 731 or the electrode 752 can be formed of indium tin oxide containing silicon oxide (ITSO), indium tin oxide (ITO), zinc oxide (ZnO), indium zinc oxide (IZO), gallium-doped zinc oxide (GZO), or the like. A liquid crystal cell 760 is formed by stacking the electrode 731, the liquid crystal 755, and the electrode 752. Note that this embodiment shows a structure of the liquid crystal cell 760 in which the liquid crystal 755 is sandwiched between the electrode 731 and the electrode 752; however, the structure of the liquid crystal cell used for the display device of the present invention is not limited to the structure. For example, a liquid crystal cell may be provided so as to cover the electrode 731 and the electrode 752 like IPS liquid crystal.

A dispenser method (dripping method) is used for the foregoing injection of the liquid crystal; however, the present invention is not limited to the method. Dipping method (pumping method) in which liquid crystal is injected after the substrate 754 is attached may be used.

Note that this embodiment shows an example in which the element formation layer 738 is used by being separated from the substrate 700; however, the foregoing element formation layer 738 is formed over the substrate 700 without providing the separation layer 702, and may be used as a display device.

In addition, the thickness of the gate insulating film 714 of all TFTs 718, 719, and 720 is the same in this embodiment; however, the present invention is not limited to this. For example, the thickness of the gate insulating film included in the TFT in a circuit which is required to drive at higher speed may be thinner than that of the other circuits.

Note that this embodiment describes with a thin film transistor as an example; however, the present invention is not limited to this. A transistor formed using single crystal silicon, and a transistor formed using SOI in addition to the thin film transistor can be used.

This embodiment mode can be implemented in combination with embodiment modes and embodiments above mentioned.

[Embodiment 7]

Figure 18A:
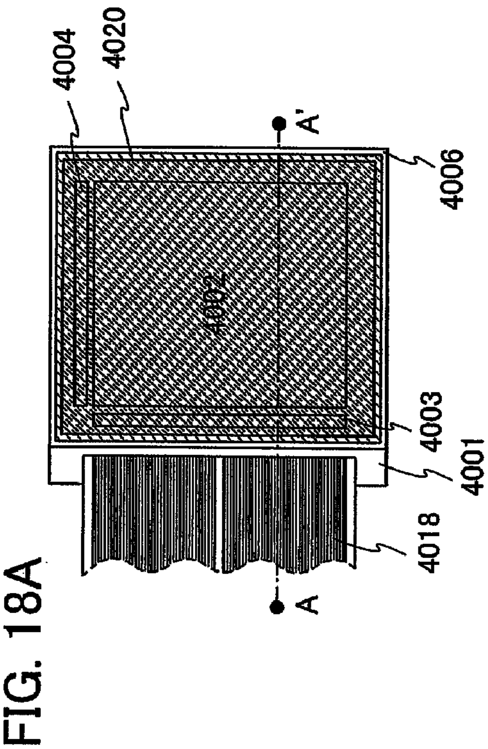
FIG. 18A is a top plan view of a display device of the present invention and 18B is a cross-sectional view of a display device of the present invention.
Figure 18B:
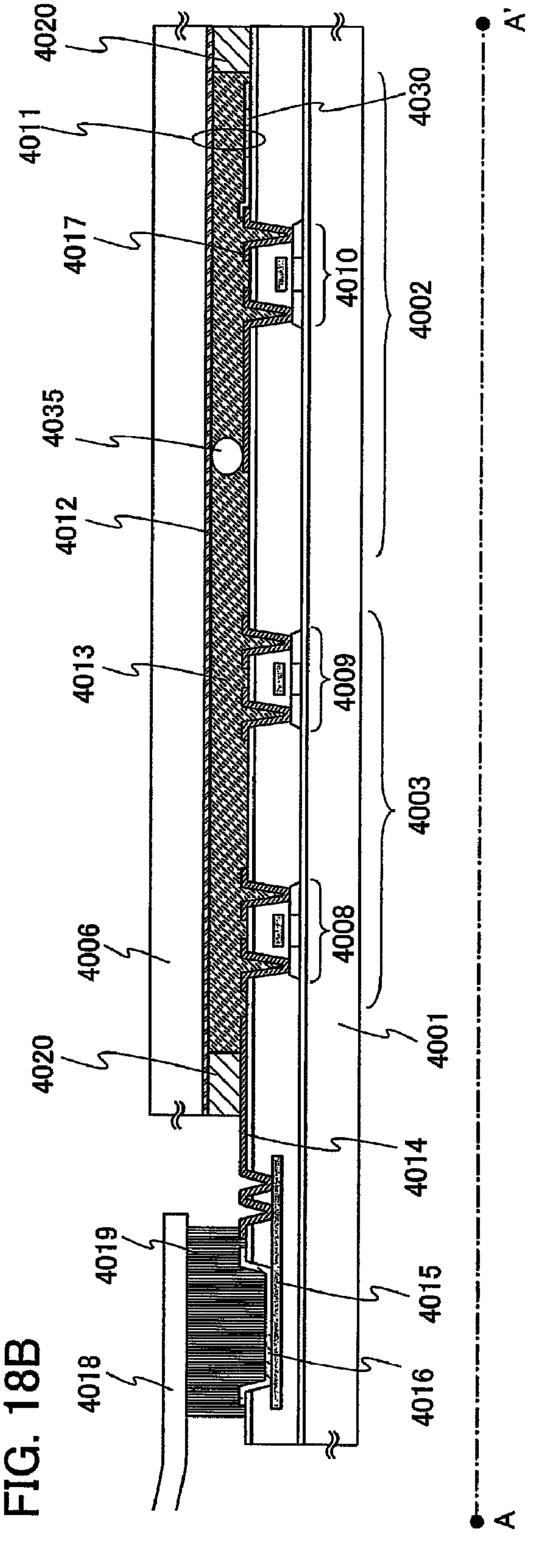

This embodiment will describe the appearance of a liquid crystal display device which is one display device of the present invention as an example, with reference to FIGS. 18A and 18B. FIG. 18A is a top plan view of a panel in which a transistor formed over a first substrate and a liquid crystal cell are formed between the first substrate and a second substrate, and FIG. 18B corresponds to a cross sectional view taken along a line A-A' in FIG. 18A.

A sealing material 4020 is provided so as to surround a pixel portion 4002, a signal line driver circuit 4003, and a scan line driver circuit 4004 provided over a first substrate 4001. In addition, a second substrate 4006 is provided over the pixel portion 4002, the signal line driver circuit 4003, and the scan line driver circuit 4004. Therefore, the pixel portion 4002, the signal line driver circuit 4003, and the scan line driver circuit 4004 are sealed with a liquid crystal 4013 by using the sealing material 4020 between the first substrate 4001 and the second substrate 4006.

Each of the pixel portion 4002, the signal line driver circuit 4003, and the scan line driver circuit 4004 provided over the first substrate 4001 has a plurality of transistors. FIG. 18B illustrates transistors 4008 and 4009 included in the signal line driver circuit 4003 and a transistor 4010 included in the pixel portion 4002.

In addition, a liquid crystal cell 4011 includes a pixel electrode 4030 connected to a source region or a drain region of the transistor 4010 via a wiring 4017, an opposite electrode 4012 formed on the second substrate 4006, and the liquid crystal 4013.

Note that it is not illustrated, but the liquid crystal display device shown in this embodiment includes an orientation film, a polarizing plate, and further, may include a color filter and a shielding film.

In addition, reference numeral 4035 is a spherical spacer which is provided to control the distance (a cell gap) between the pixel electrode 4030 and the opposite electrode 4012. In addition, a spacer which is obtained by patterning an insulating film may be used.

Various kinds of voltages and signals applied to the signal line driver circuit 4003, the scan line driver circuit 4004 or the pixel portion 4002 are supplied from a connection terminal 4016 via wirings 4014 and 4015. The connection terminal 4016 is electrically connected to a FPC 4018 and an anisotropic conductive film 4019.

This embodiment mode can be implemented in combination with embodiment modes and embodiments above mentioned.

[Embodiment 8]

Figure 19A:
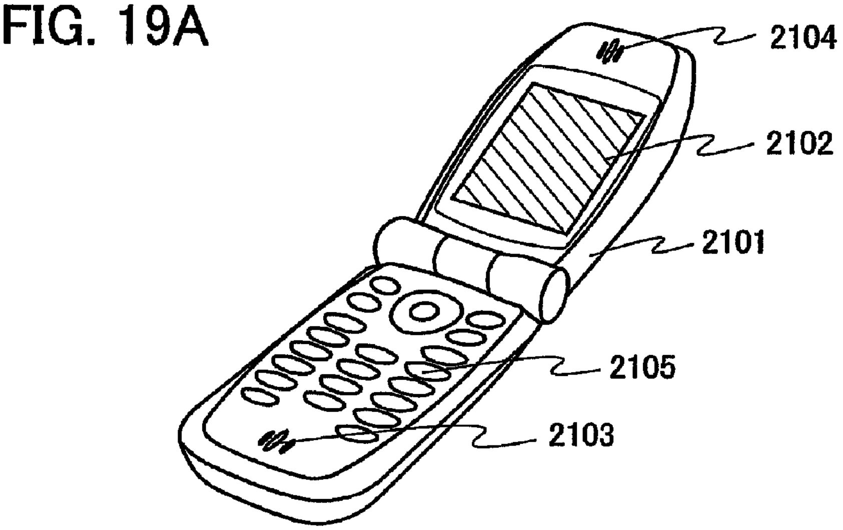
FIGS. 19A to 19C are examples of electronic devices each using a display device of the present invention.
Figure 19B:
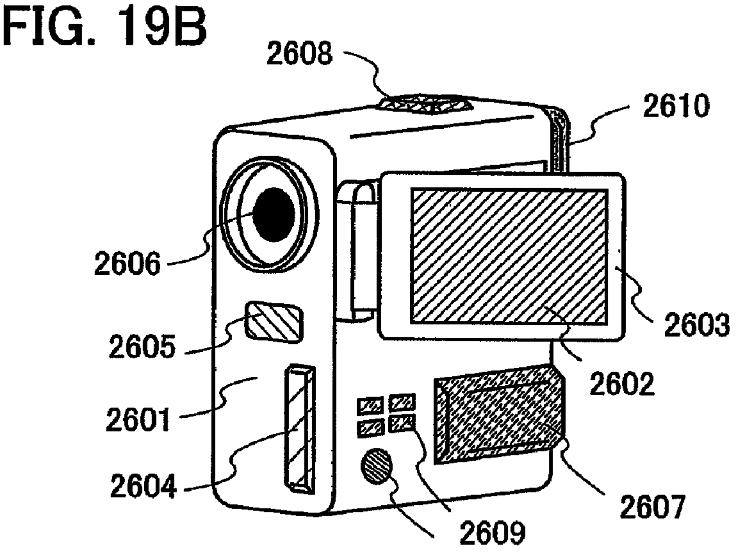
Figure 19C:
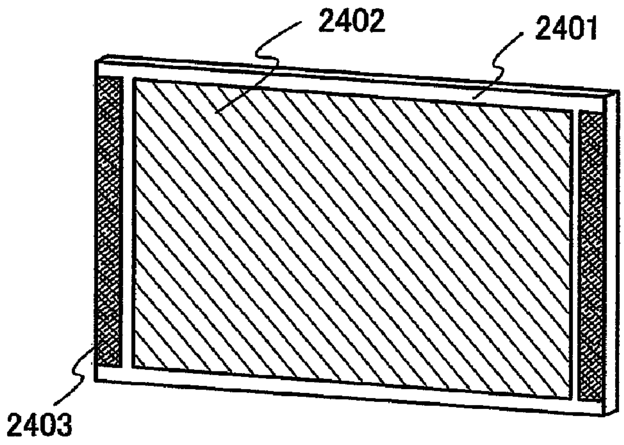
Figure 20A:
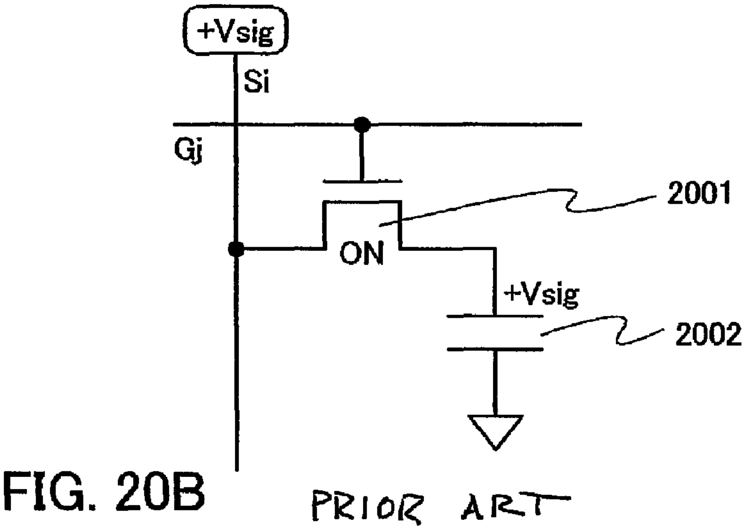
FIG. 20A PRIOR ART
FIGS. 20A to 20C are circuit diagrams in order to describe conventional problems.
Figure 20B:
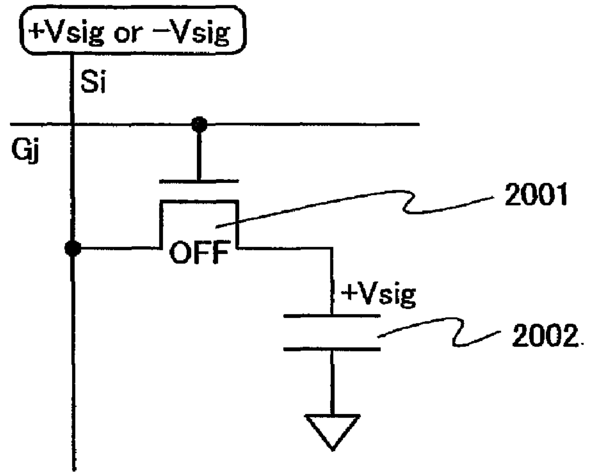
FIG. 20B PRIOR ART
Figure 20C:
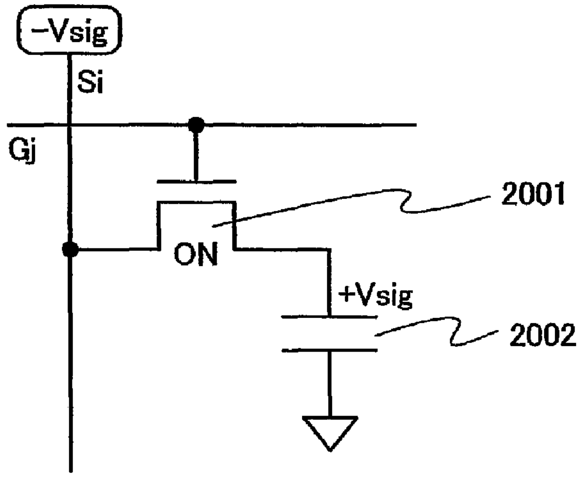
FIG. 20C PRIOR ART
Figure 21:
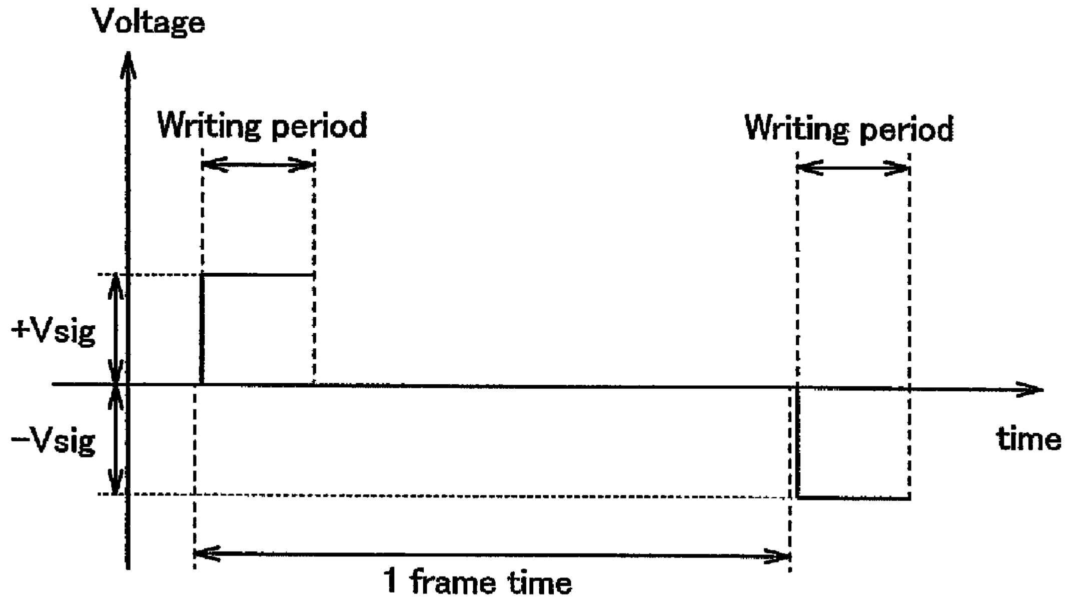
FIG. 21 PRIOR ART
FIG. 21 is a timing chart showing a conventional driving method.

Electronic devices using the display device of the invention include cellular phones, portable game consoles or electronic books, cameras such as video cameras and digital still cameras, goggle-type displays (head mounted displays), navigation systems, audio reproducing devices (such as car audios and audio components), laptop personal computers, image reproducing devices provided with a recording medium (specifically, a device for reproducing a content of a recording medium such as a digital versatile disc (DVD) and having a display for displaying the reproduced image) and the like. FIGS. 19A to 19C show specific examples of these electronic devices.

FIG. 19A shows a cellular phone, which includes a main body 2101, a display portion 2102, an audio input portion 2103, an audio output portion 2104, and operation keys 2105. By using a display device of the invention for forming the display portion 2102, a cellular phone with high reliability can be obtained.

FIG. 19B is a video camera which includes a main body 2601, a display portion 2602, a housing 2603, an external connections port 2604, a wireless remote controller receiver 2605, an image receiving portion 2606, a battery 2607, an audio input portion 2608, an operation key 2609, an eye piece portion 2610, or the like. By using a display device of the invention for forming the display portion 2602, a video camera with high reliability can be obtained.

FIG. 19C is an image display unit which includes a housing 2401, a display portion 2402, a speaker portion 2403, or the like. By using a display device of the invention for forming the display portion 2402, a display unit with high reliability can be obtained. Note that the image display unit includes all devices for displaying image such as for a personal computer, for receiving TV broadcasting, and for displaying an advertisement, or the like.

As described above, the application range of the present invention is so wide that the invention can be applied to electronic devices of various fields.

This embodiment mode can be implemented in combination with embodiment modes and embodiments above mentioned.

This application is based on Japanese Patent Application serial no. 2007-076283 filed with Japan Patent Office on 23, Mar., 2007, the entire contents of which are hereby incorporated by reference.

What is claimed is:

1. A display device comprising:
a first circuit configured to sample a video signal;
power supply lines configured to be supplied with different power supply voltages;
a second circuit configured to select sequentially the power supply lines, to increase step by step an absolute value of the video signal and to supply the video signal to a signal line;
a transistor electrically connected to the signal line;
a display element electrically connected to the transistor; and
a capacitor element electrically connected to the transistor,
wherein the second circuit is electrically connected to the display element and to the capacitor element through the transistor,
wherein a voltage applied between a source and a drain of the transistor over time is represented by the following formula:

$$\Delta V_{sig} \times e^{-(t-ts)/\tau},$$

wherein t is a time,
wherein $\tau$ is a relaxation time,
wherein $\Delta V_{sig}$ is a difference between a potential of a first power supply line and a potential of a second power supply line,
wherein $t_s$ is a period for switching from the first power supply line to the second power supply line,
wherein a relation of t and $t_s$ is represented by a following formula:

$$m \times t_s < t \leqq (m+1) \times t_s < t_w,$$

wherein m is an integer larger than 1,
wherein $t_w$ is a time of one frame period, and
wherein the first power supply line and the second power supply line are included in the power supply lines and are adjacent to each other.

2. A display device according to claim 1, wherein the video signal has a stairs shape.

3. A display device according to claim 1, wherein the video signal has a parabolic shape.

4. A display device according to claim 1 further comprising a pixel electrically connected to the signal line,
wherein the pixel includes the transistor, the display element, and the capacitor element.

5. A display device according to claim 1,
wherein the relaxation time $\tau$ is represented by the formula, $\tau=(Cs+Cl)\times R$, and
wherein Cs is the capacitance of the capacitor element, Cl is the capacitance of the display element, and R is a wiring resistance.

6. A display device comprising:
a first circuit configured to sample a video signal;
power supply lines configured to be supplied alternately with a first power supply voltage and a second power supply voltage different from each other;
a second circuit configured to select sequentially the power supply lines, to increase step by step an absolute value of the video signal and to supply the video signal to a signal line,
a transistor electrically connected to the signal line;
a display element electrically connected to the transistor; and
a capacitor element electrically connected to the transistor,
wherein the first power supply voltage and the second power supply voltage have opposite polarities,
wherein a voltage applied between a source and a drain of the transistor over time is represented by the following formula:

$$\Delta V_{sig} \times e^{-(t-ts)/\tau},$$

wherein t is a time,
wherein $\tau$ is a relaxation time,.
wherein $\Delta V_{sig}$ is a difference between a potential of a first power supply line and a potential of a second power supply line,
wherein $t_s$ is a period for switching from the first power supply line to the second power supply line,
wherein a relation of t and $t_s$ is represented by a following formula:

$$m \times t_s < t \leqq (m+1) \times t_s < t_w,$$

wherein m is an integer larger than 1,
wherein $t_w$ is a time of one frame period, and
wherein the first power supply line and the second power supply line are included in the power supply lines and are adjacent to each other.

7. A display device according to claim 6, wherein the video signal has a stairs shape.

8. A display device according to claim 6, wherein the video signal has a parabolic shape.

9. A display device according to claim 6 further comprising a pixel electrically connected to the signal line,
wherein the pixel includes the transistor, the display element, and the capacitor element.

10. A display device according to claim 6,
wherein the relaxation time $\tau$ is represented by the formula, $\tau=(Cs+Cl)\times R$, and
wherein Cs is the capacitance of the capacitor element, Cl is the capacitance of the display element, and R is a wiring resistance.

11. A driving method for driving a display device comprising the steps of:
increasing step by step a positive voltage to be applied to a signal line in a first frame time; and
increasing step by step an absolute value of a negative voltage to be applied to the signal line in a second frame time,
wherein the positive voltage and the negative voltage are alternately inputted to a pixel via a transistor,
wherein the step of increasing the positive voltage is performed by switching power supply lines,
wherein the pixel includes a display element and a capacitor element,
wherein an absolute value of the positive voltage or the negative voltage applied between a source and a drain of the transistor over time is represented by the following formula:

$$\Delta V_{sig} \times e^{-(t-ts)/\tau},$$

wherein t is a time, wherein τ is a relaxation time, wherein $\Delta V_{sig}$ is a difference between a potential of a first power supply line and a potential of a second power supply line, wherein $t_s$ is a period for switching from the first power supply line to the second power supply line, wherein a relation of t and $t_s$ is represented by a following formula:

$$m \times t_s < t \leqq (m+1) \times t_s < t_w,$$

wherein in is an integer larger than 1, wherein $t_w$ is a time of one frame period, and wherein the first power supply line and the second power supply line are included in the power supply lines and are adjacent to each other.

12. A driving method for driving a display device according to claim 11, wherein the positive voltage and the negative voltage have stairs shapes.

13. A driving method for driving a display device according to claim 11, wherein the positive voltage and the negative voltage have parabolic shapes.

14. A driving method for driving a display device according to claim 11, wherein the relaxation time τ is represented by the formula, $\tau = (Cs + Cl) \times R$, wherein Cs is the capacitance of the capacitor element, Cl is the capacitance of the display element, and R is a wiring resistance.

* * * * *